(12) United States Patent
Kim et al.

(10) Patent No.: US 9,223,785 B2
(45) Date of Patent: Dec. 29, 2015

(54) MOBILE TERMINAL DISPLAYING PAGE OF E-BOOK AND BACKGROUND IMAGE AND CONTROLLING METHOD THEREOF

(75) Inventors: Miyoung Kim, Seoul (KR); Younghoon Song, Seoul (KR); Yoomee Song, Seoul (KR); Minjeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 966 days.

(21) Appl. No.: 13/398,388

(22) Filed: Feb. 16, 2012

(65) Prior Publication Data

US 2012/0303603 A1    Nov. 29, 2012

(30) Foreign Application Priority Data

May 25, 2011    (KR) .......................... 10-2011-0049611

(51) Int. Cl.
*G06F 17/30* (2006.01)
*G06F 3/0483* (2013.01)

(52) U.S. Cl.
CPC ........ *G06F 17/30056* (2013.01); *G06F 3/0483* (2013.01)

(58) Field of Classification Search
CPC .......................... G06F 17/30056; G06F 3/0483
USPC .......................... 715/243, 273, 764; 707/694
See application file for complete search history.

(56) References Cited

U.S. PATENT DOCUMENTS

| | | | | |
|---|---|---|---|---|
| 8,116,768 | B2* | 2/2012 | Kishida et al. | ............. 455/435.1 |
| 2002/0132610 | A1 | 9/2002 | Chaplin et al. | |
| 2007/0195105 | A1* | 8/2007 | Koberg | ........................ 345/582 |
| 2008/0307342 | A1* | 12/2008 | Furches et al. | ................ 715/764 |
| 2009/0235150 | A1* | 9/2009 | Berry | ............................. 715/205 |
| 2011/0050594 | A1* | 3/2011 | Kim et al. | ..................... 345/173 |

FOREIGN PATENT DOCUMENTS

| | | | |
|---|---|---|---|
| CN | 101166128 | A | 4/2008 |
| CN | 101576804 | A | 11/2009 |
| CN | 101984420 | A | 3/2011 |
| CN | 101986247 | A | 3/2011 |
| WO | WO 2010/125768 | A2 | 11/2010 |

* cited by examiner

*Primary Examiner* — Alexey Shmatov
(74) *Attorney, Agent, or Firm* — Birch, Stewart, Kolasch & Birch, LLP

(57) ABSTRACT

A mobile terminal and controlling method thereof are disclosed, by which a more convenient e-book reading environment can be provided through background video and/or audio settings. The present invention includes a touchscreen configured to display a first page of an e-book including at least one or more pages, a memory unit configured to store the e-book and at least one image, a communication unit configured to exchange data with an external device by wire/wireless, and a controller searching at least one of the memory unit and a search server connected via the communication unit for at least one or more candidate images with a search word determined using at least one portion of a content of the first page, the controller controlling a first one of the found at least one or more candidate images to be displayed as a background image of the first page.

15 Claims, 23 Drawing Sheets

(a)

(b)

(c)

(d)

FIG. 5
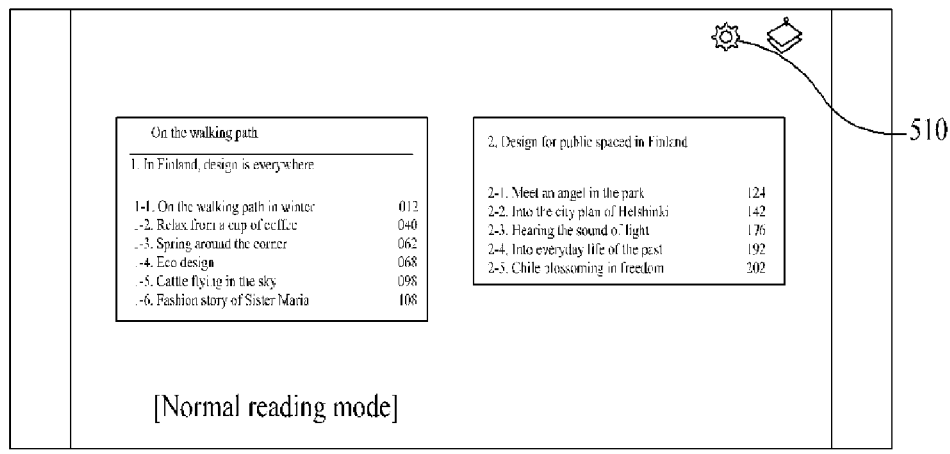
(a)
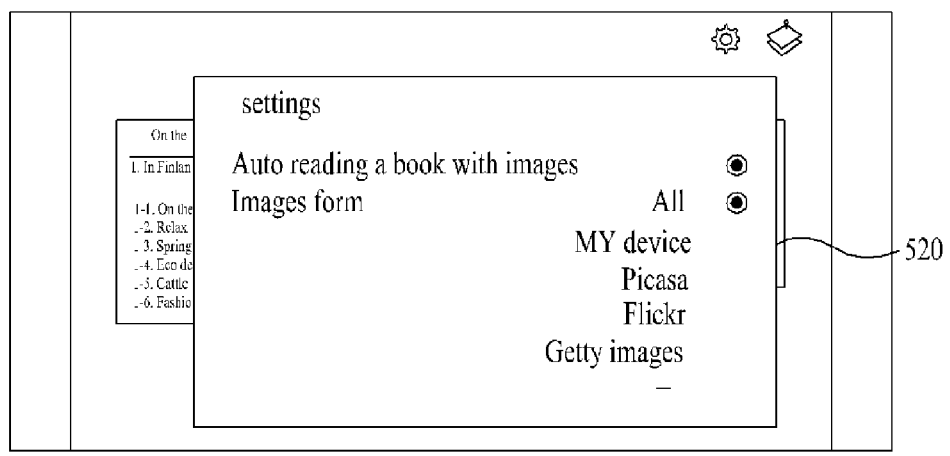
(b)
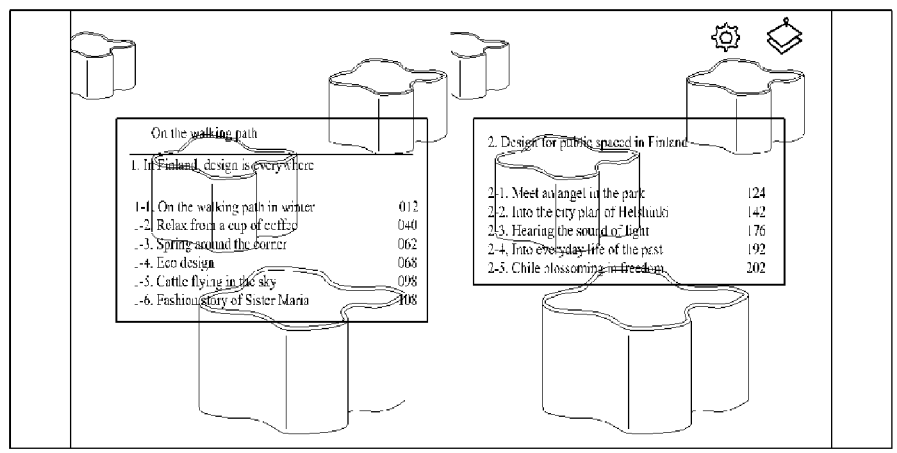
(c)

FIG. 6
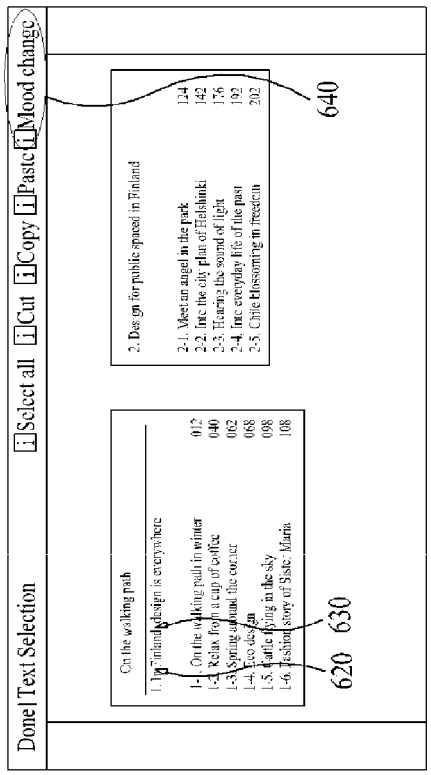
(a)
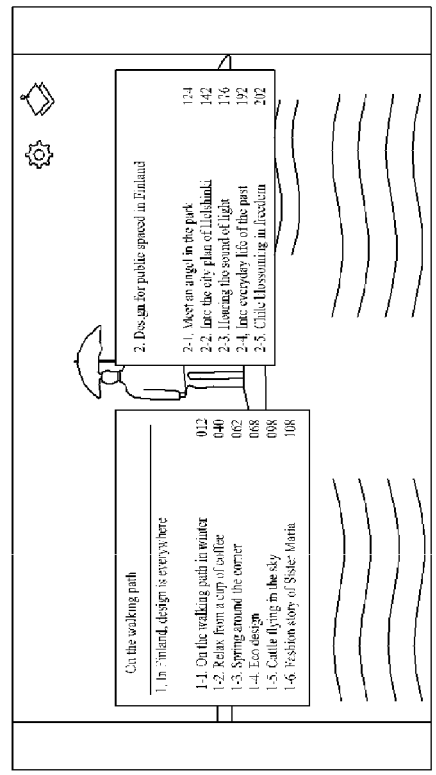
(b)
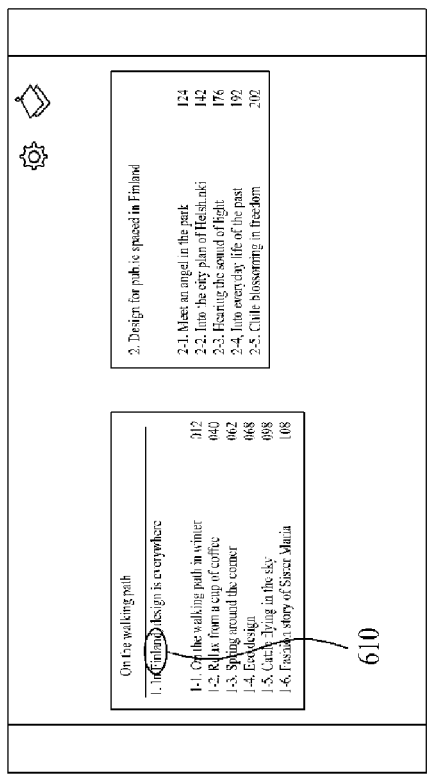
(c)
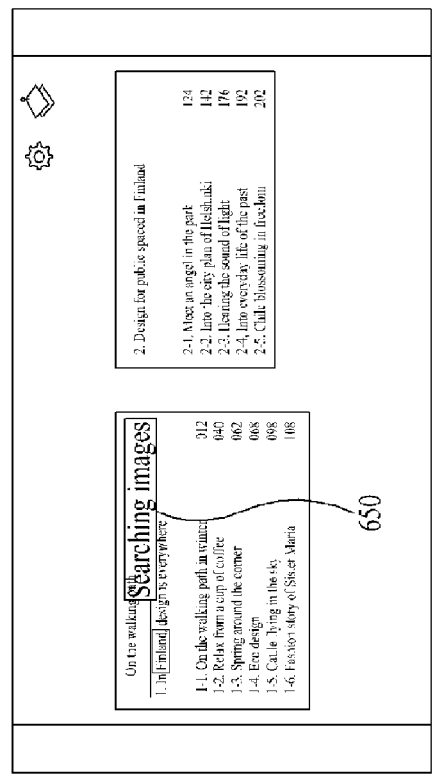
(d)

FIG. 9
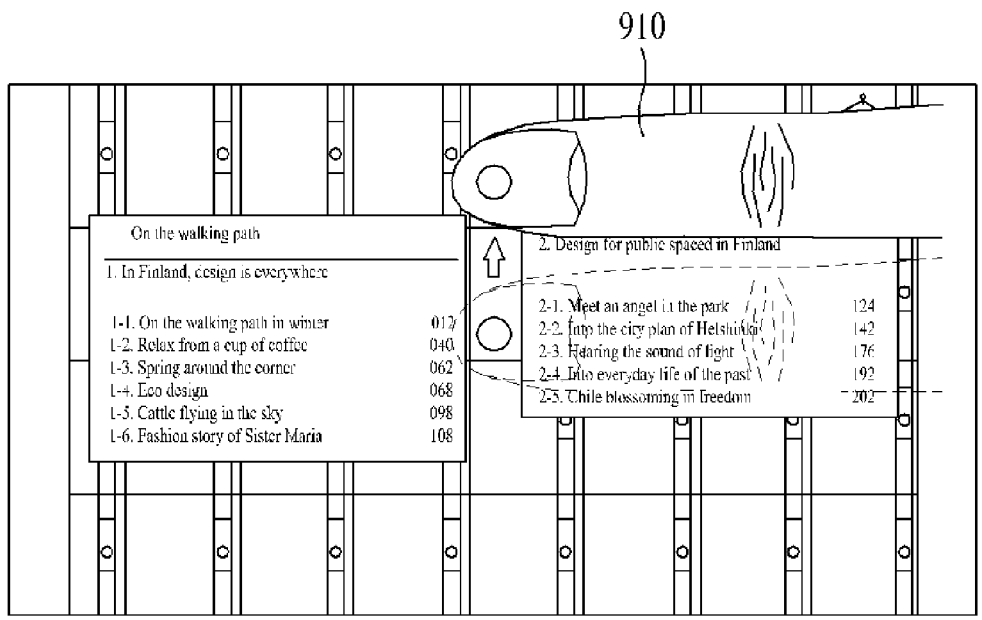
(a)
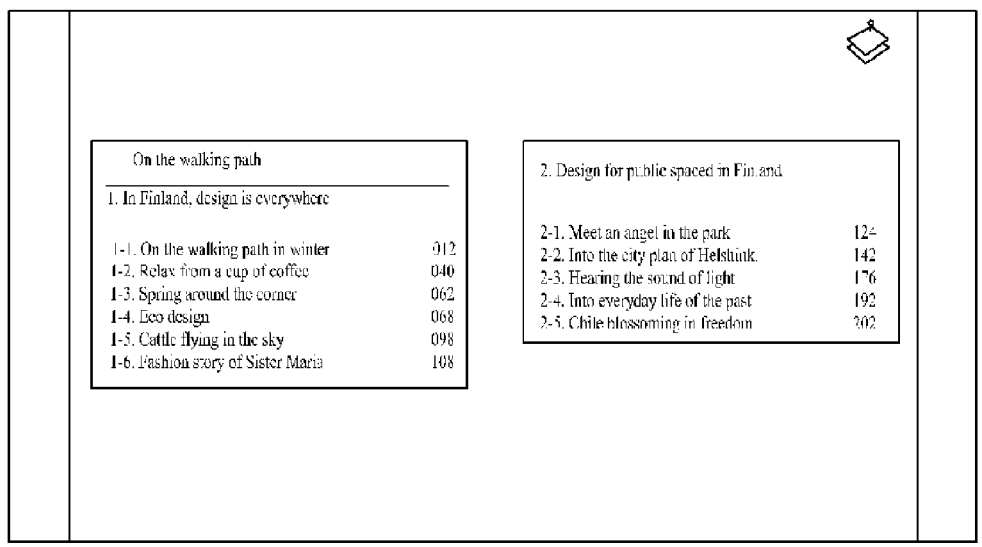
(b)

FIG. 10
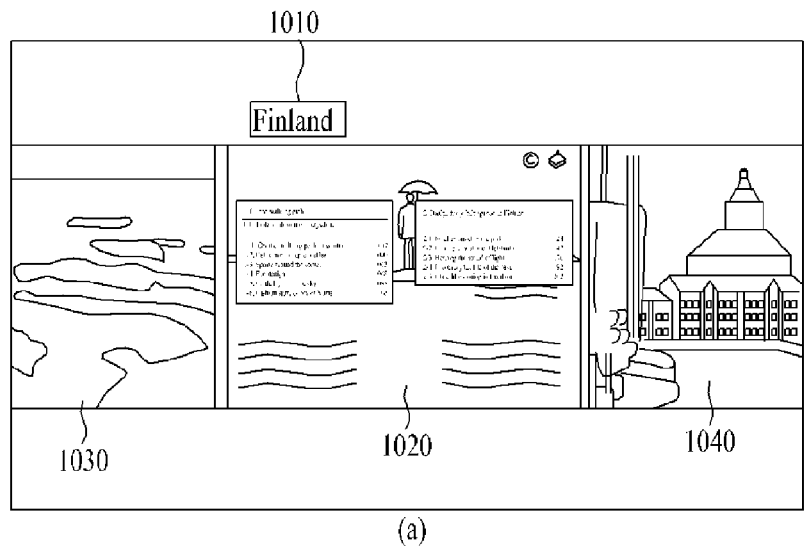
(a)
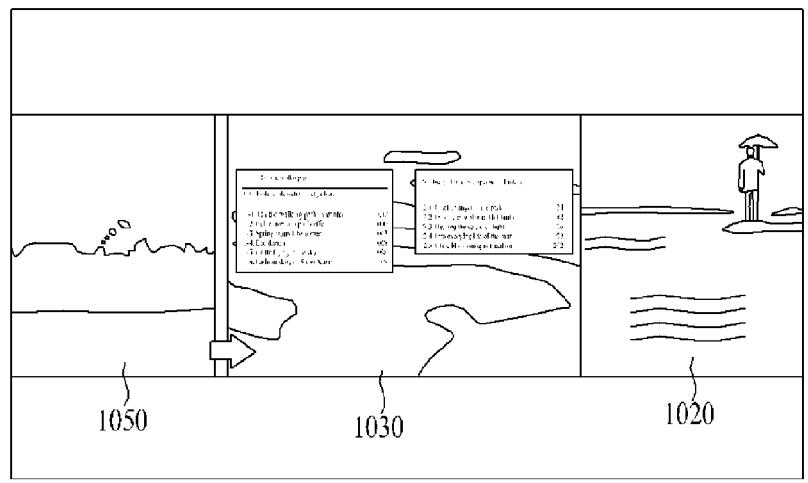
(b)
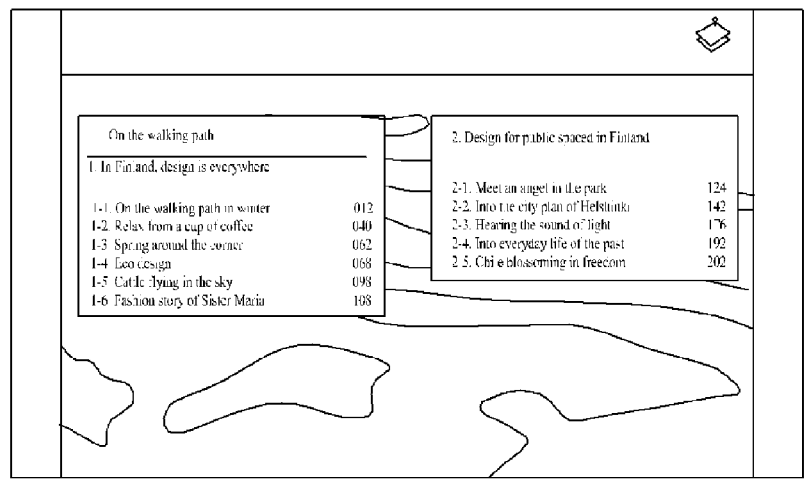
(c)

FIG. 12
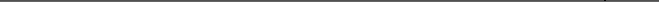
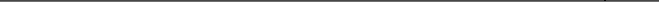

FIG. 13
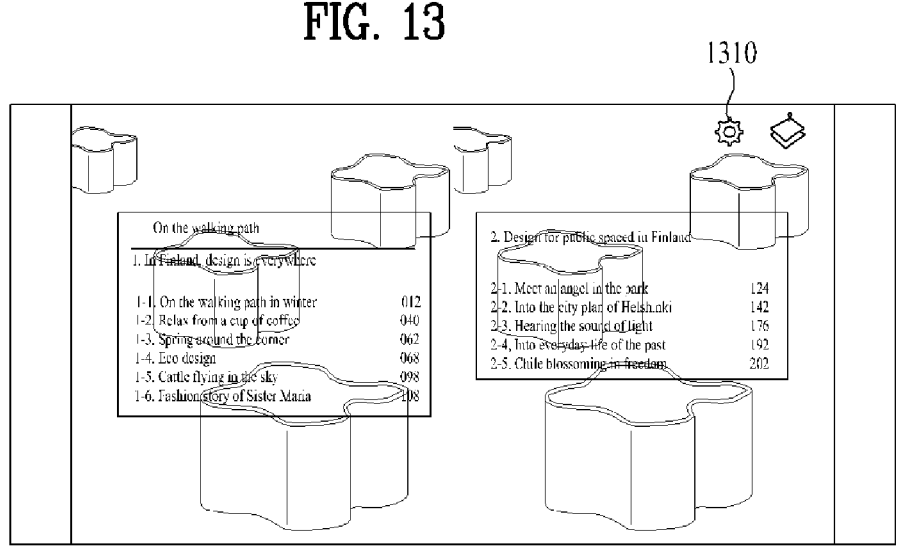
(a)
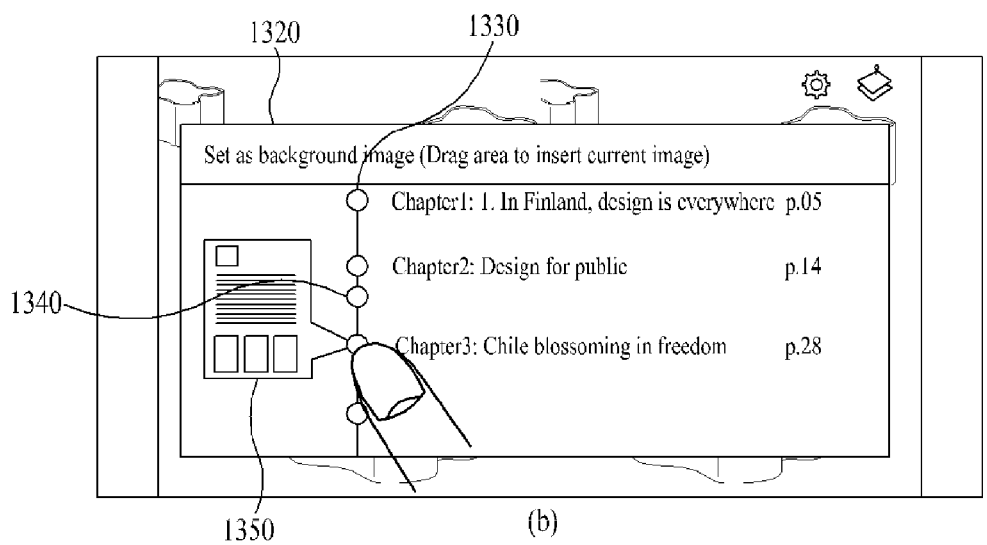
(b)
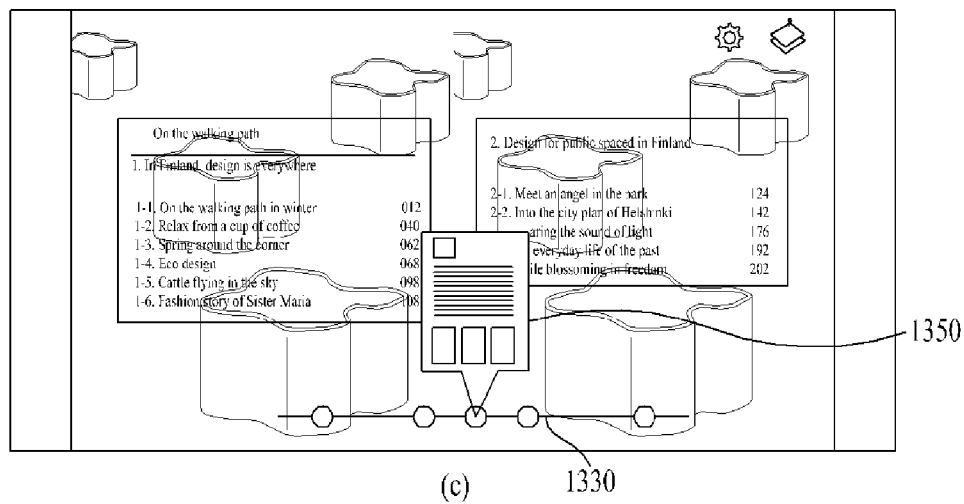
(c)

FIG. 14
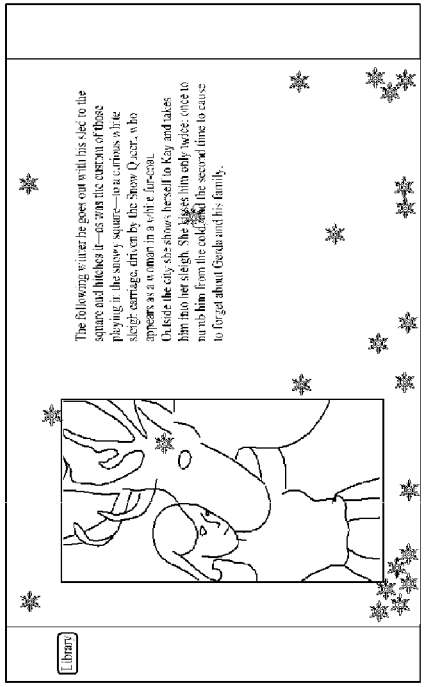
(a)
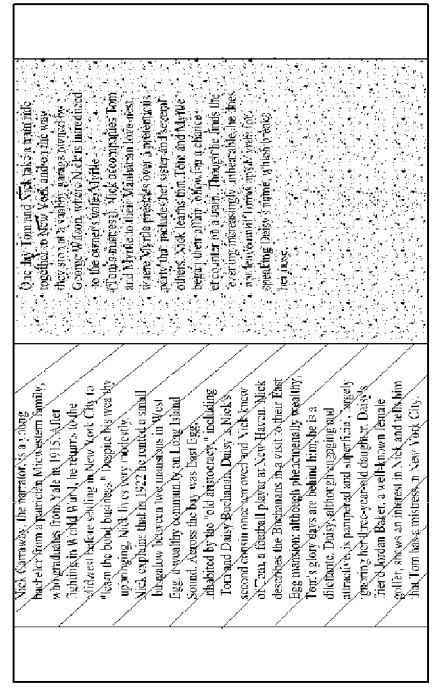
(b)
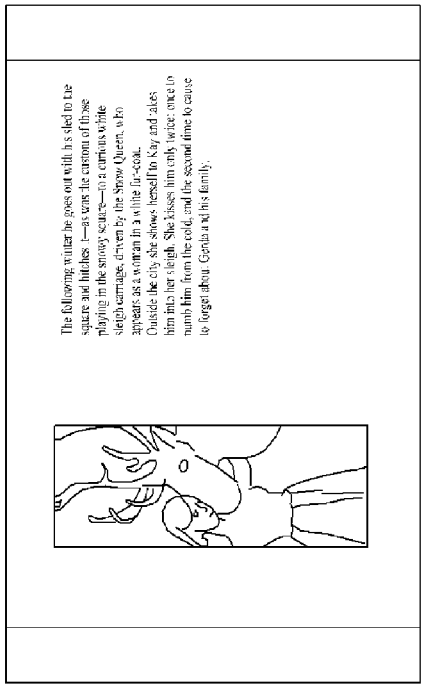
(c)
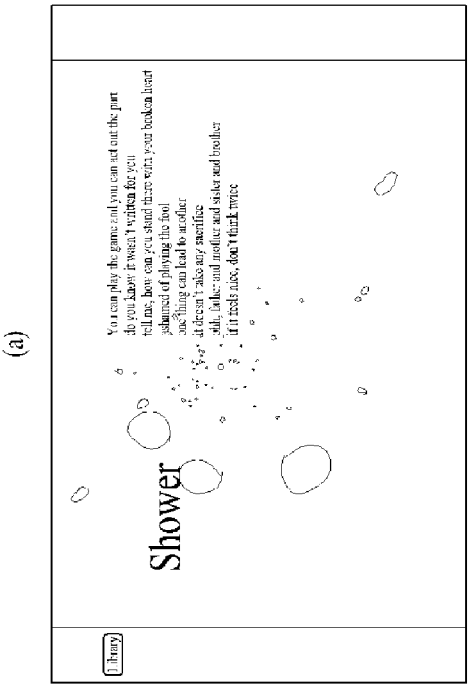
(d)

FIG. 16
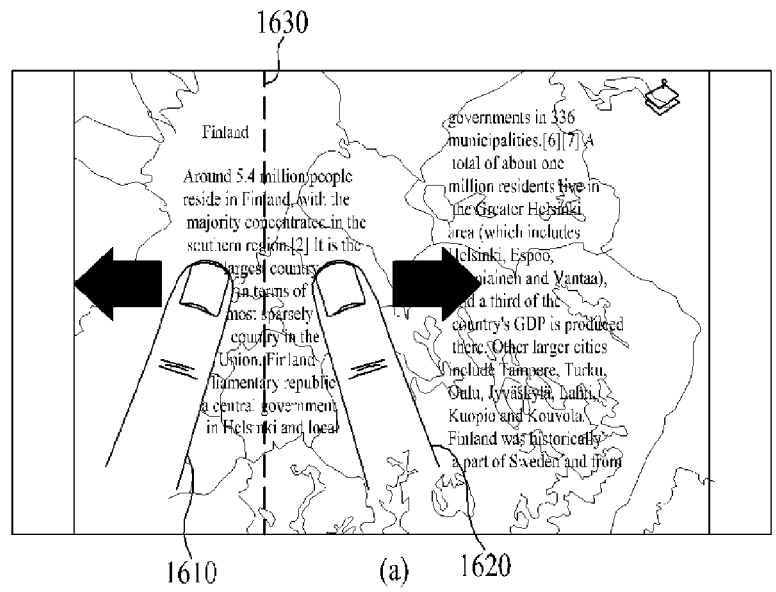
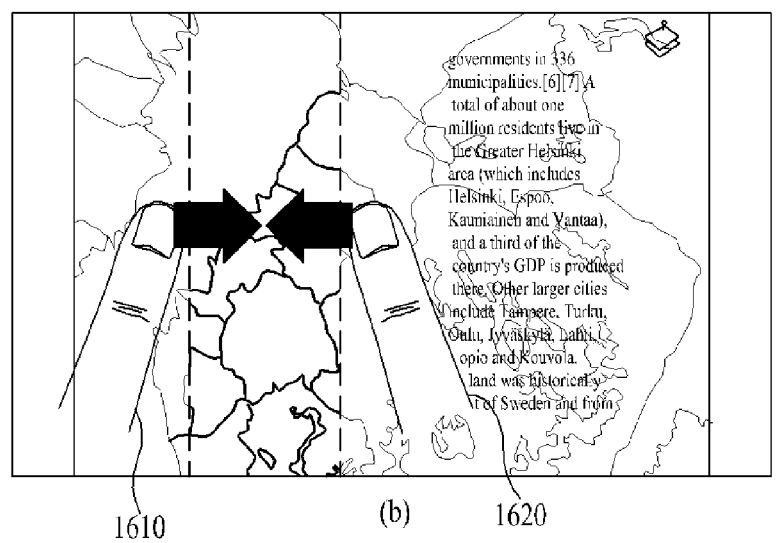

FIG. 17
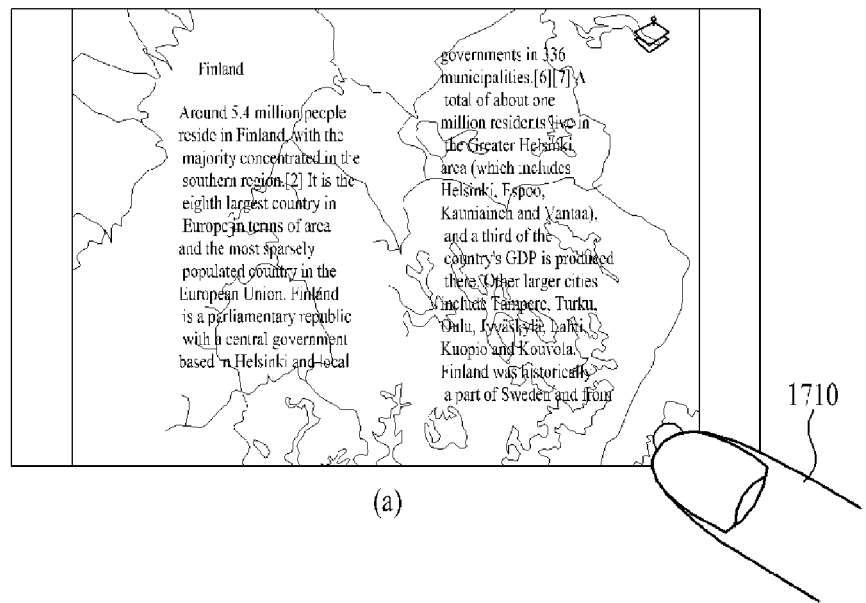
(a)
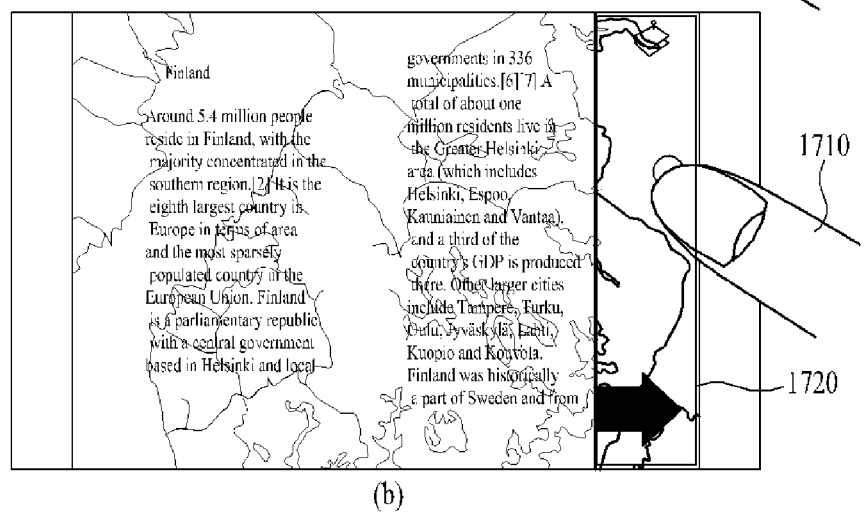
(b)
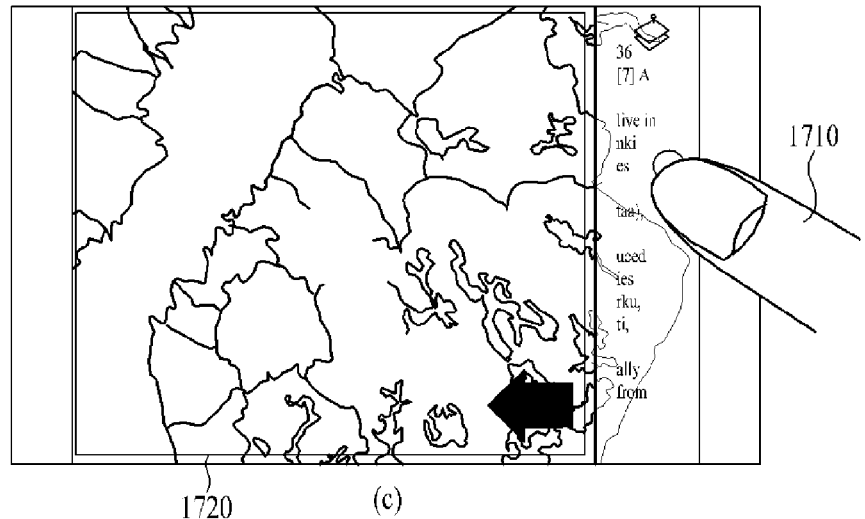
(c)

FIG. 20
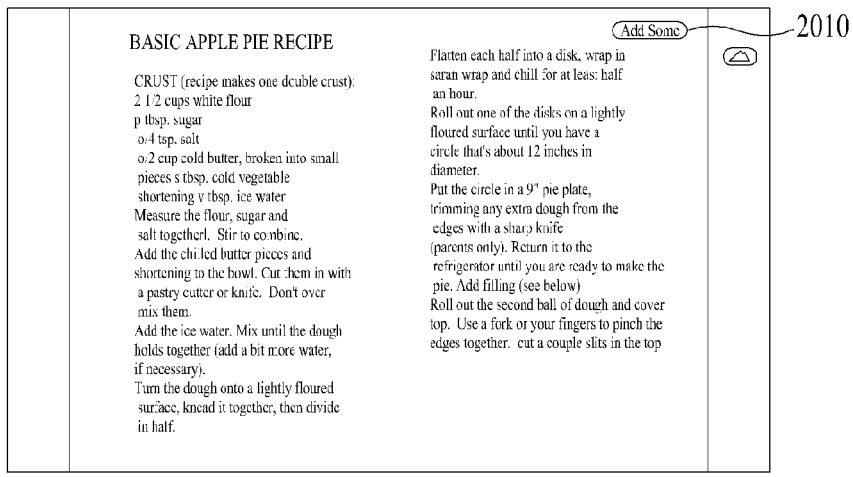
(a)
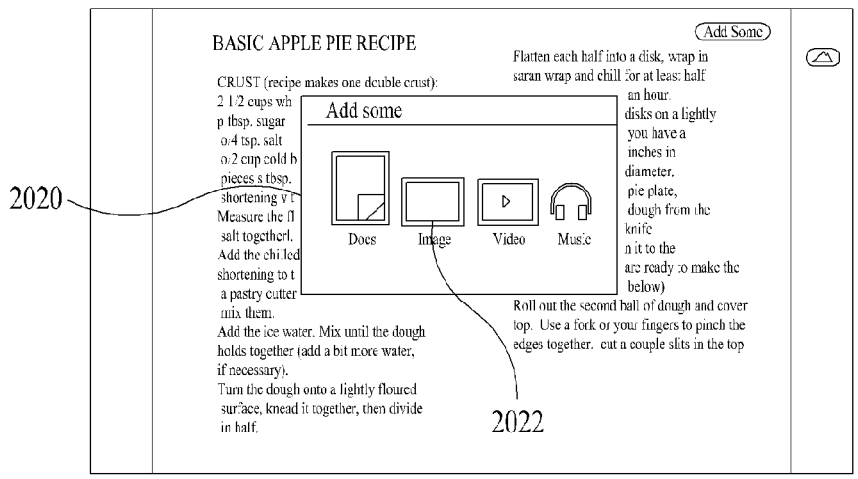
(b)
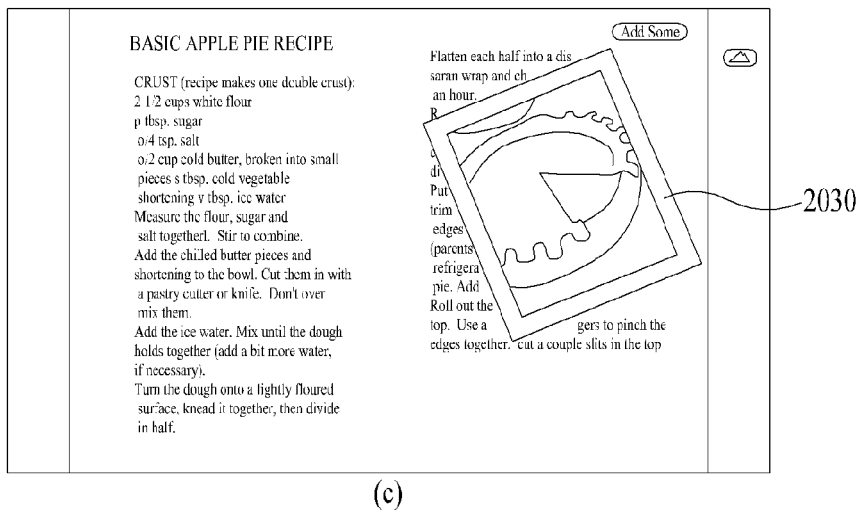
(c)

MOBILE TERMINAL DISPLAYING PAGE OF E-BOOK AND BACKGROUND IMAGE AND CONTROLLING METHOD THEREOF

Pursuant to 35 U.S.C. §119(a), this application claims the benefit of earlier filing date and right of priority to Korean Patent Application No. 10-2011-0049611, filed on May 25, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing a more convenient e-book reading environment.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, an e-book reading in a mobile terminal is generalized. In this case, the e-book is a special format of a file that can be viewed via a portable device (e.g., mobile phone, PMP, PDA, etc.). In general, an e-book means a special format of a file in which a DRM function is loadable for copyright protection rather than such a universal file format as a text file. Occasionally, the e-book supports a memo function, a lining function, a search function and the like in general in accordance with an e-book solution. However, as an e-book is normally implemented in a manner that a text is displayed on such a predetermined background as a white background and the like, it is unable to provide various visual effects. Moreover, user's customizing is impossible.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which an e-book can be read more conveniently.

Another object of the present invention is to provide a mobile terminal and controlling method thereof, by which audio-visual information can be conveniently set or replaced in the course of reading an e-book.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display a first page of an e-book including at least one or more pages, a memory unit configured to store the e-book and at least one image, a communication unit configured to exchange data with an external device by wire/wireless, and a controller searching at least one of the memory unit and a search server connected via the communication unit for at least one or more candidate images with a search word determined using at least one portion of a content of the first page, the controller controlling a one, preferably the first or predetermined one of the found at least one or more candidate images to be displayed as a background image of the first page.

Preferably, if there is a second touch input to a text content of the first page on the touchscreen, the controller displays a first icon and a second icon in the vicinity of a point to which the second touch input is applied and wherein if a third touch input is applied, the controller determines the text situated between the first icon and the second icon as the search word.

Preferably, if the second touch input is applied, the controller displays an image search icon on a prescribed region on the touchscreen and wherein if a touch input to the image search icon is detected, the controller recognizes that the third touch input is applied.

Preferably, the controller displays the determined search word on a second region of the touchscreen, wherein if a touch input to the search word is detected, the controller searches for a word related to the search word and then controls the found word to be displayed on the second region.

In another aspect of the present invention, a method of controlling a mobile terminal includes the steps of displaying a first page of an e-book including at least one or more pages, searching for at least one or more candidate images with a search word determined using at least one portion of a content of the first page, and displaying a first one of the found at least one or more candidate images to be displayed as a background image of the first page.

In another aspect of the invention, a method of controlling a mobile terminal is provided, the method comprising: transmitting an identification information of an e-book to an external server via a communication unit; receiving a first background image information including at least one image applicable to at least one page of the e-book via the communication unit; and displaying the first background image information on a display unit by applying the first background image information to the e-book.

Preferably, further comprising: receiving a list of a plurality of background image information from the external server; displaying the list on the display unit; and selecting the first background image information from the list via a user input unit.

Preferably, the first background image information includes a plurality of different images prepared per page or chapter.

Accordingly, the present invention provides the following effects and/or advantages.

First of all, a user can read an e-book more conveniently using a mobile terminal according to at least one embodiment of the present invention.

Secondly, the present invention enables a user to perform a customizing for setting various kinds of audio-visual informations as backgrounds selectively by means of a search for contents in the course of reading an e-book.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram for one example of setting a background image function in a mobile terminal according to one embodiment of the present invention;

FIG. 6 is a diagram for a method of selecting a search word for a background image search of an e-book from a text in a mobile terminal according to one embodiment of the present invention;

FIG. 9 is a diagram for one example of a method of canceling a setting of an image from a background image in a mobile terminal according to one embodiment of the present invention;

FIG. 10 is a diagram for one example of displaying a plurality of candidate images in a mobile terminal according to one embodiment of the present invention;

FIG. 12 is a diagram for another example of displaying a plurality of candidate images in a mobile terminal according to one embodiment of the present invention;

FIG. 13 is a diagram for one example of a method of selecting an applied range of a background image set in a mobile terminal according to one embodiment of the present invention;

FIG. 14 is a diagram for one example of displaying a visual effect except a still image as a background in a mobile terminal according to one embodiment of the present invention;

FIG. 16 is a diagram for one example of a method of checking a portion of an image set as a background without interruption of a text in a mobile terminal according to one embodiment of the present invention;

FIG. 17 is a diagram for one example of a method of checking a whole image set as a background without interruption of a text in a mobile terminal according to one embodiment of the present invention;

FIG. 20 is a diagram for one example of changing a layout to display an image found from a specific page on a most upper layer in a mobile terminal according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
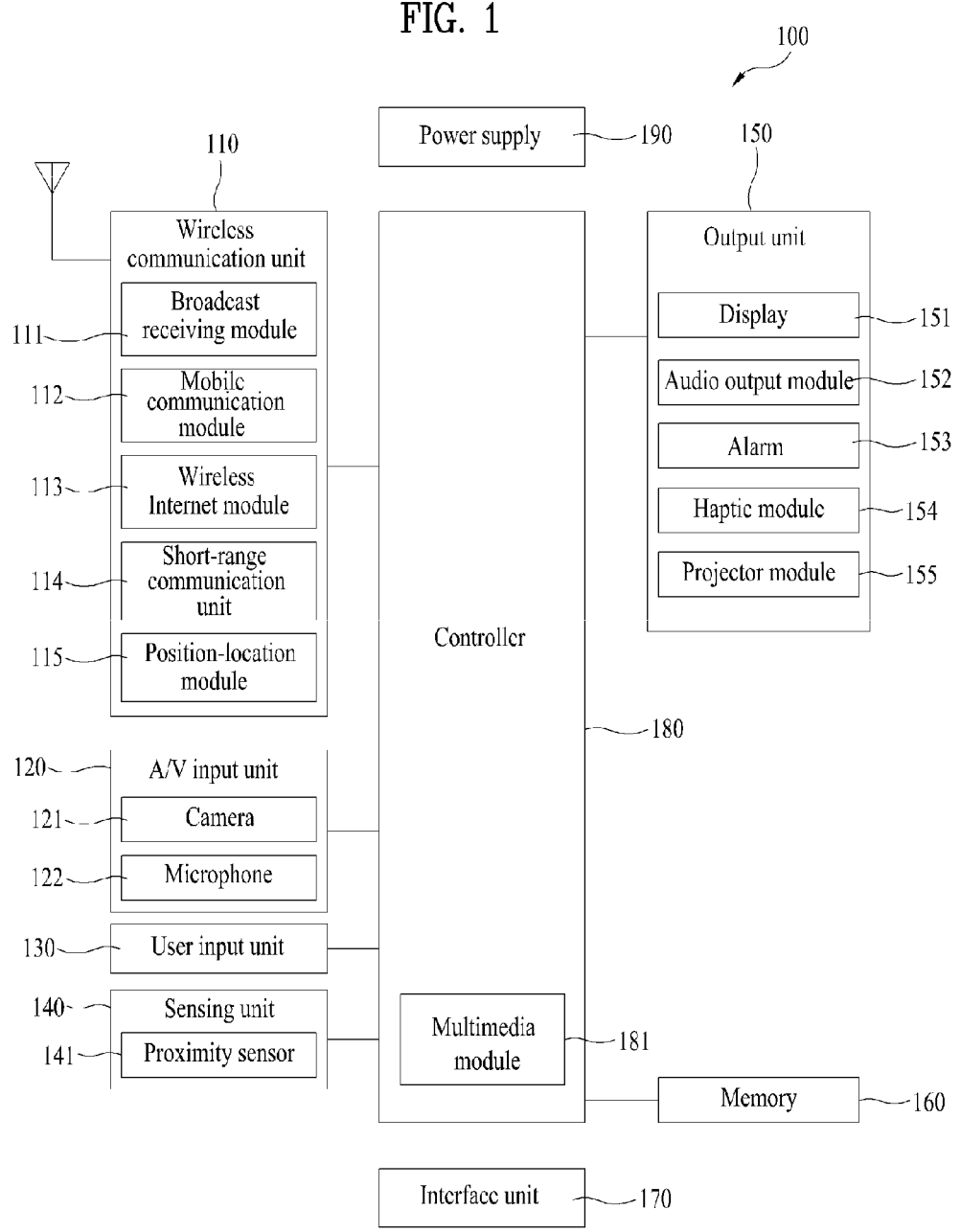
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only) (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like. haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
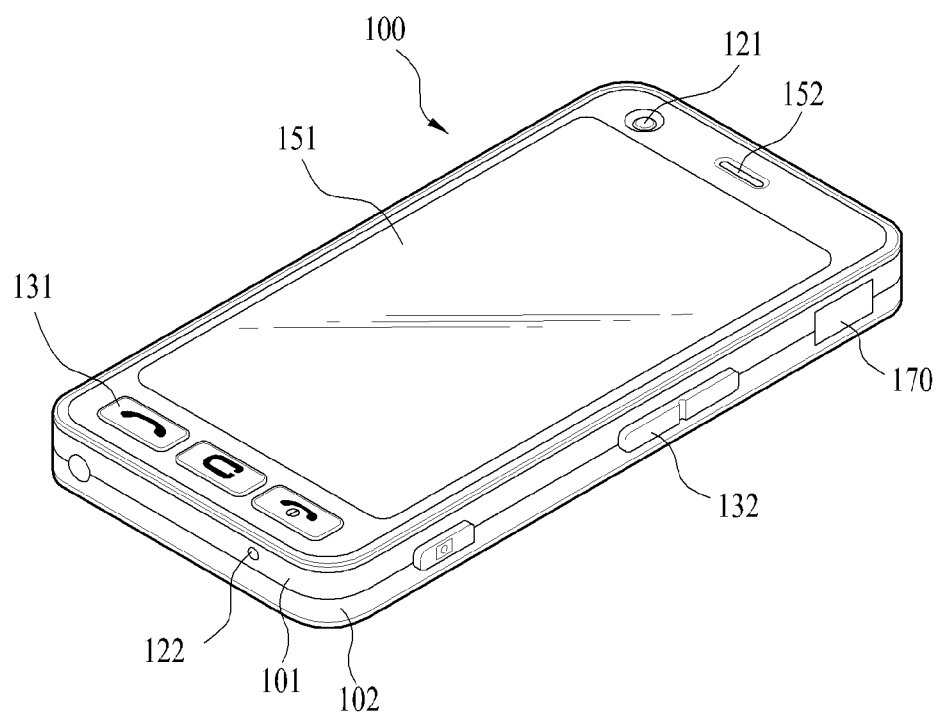
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
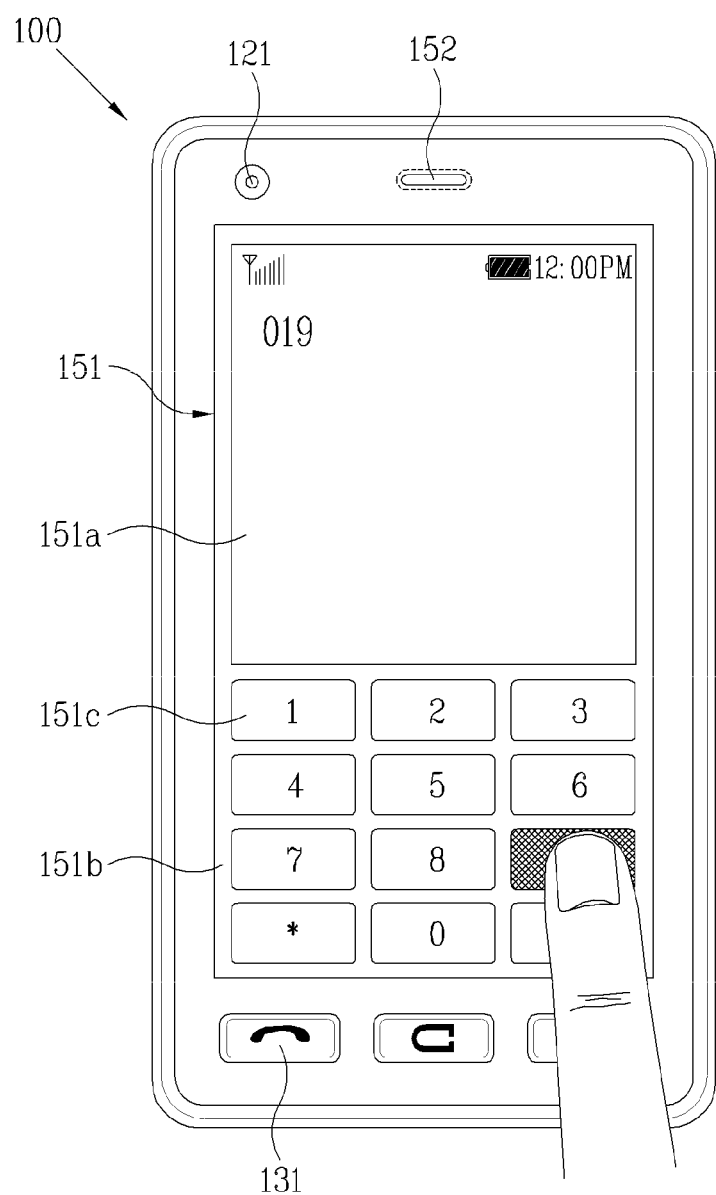
FIG. 3 is a front diagram of a mobile terminal according to one embodiment of the present invention to describe one operational status thereof.

FIG. 3 is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is inputted through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

Setting of Background Image

In order to display an e-book, a mobile terminal according to the present invention can be configured as an e-book dedicated terminal of which main function is an e-book display/reading. Alternatively, the mobile terminal according to the present invention can be configured to perform various functions including a function of displaying an e-book through application. In general, an e-book displayed in a mobile terminal in accordance with the above-mentioned configuration is mainly focused on a text display function only in a manner of being implemented to display a text on such a predetermined background as a white background. Therefore, it is unable to provide various visual effects and user's customizing is impossible.

To overcome or solve the above-mentioned problems, one embodiment of the present invention proposes to perform a video/audio search using preset information or at least one partial information of an e-book content and to play the found video/audio on a background. A process for implementing the proposal is described with reference to FIG. 4 as follows.

Figure 4:
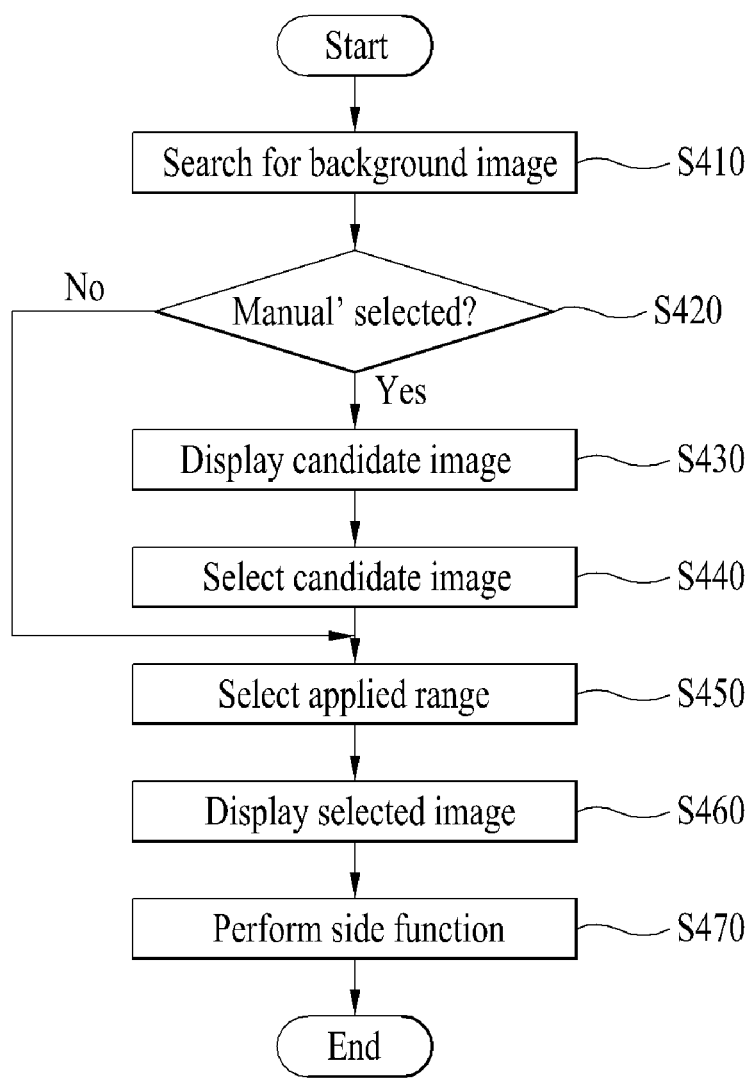
FIG. 4 is a flowchart for one example of a process for searching background images in a mobile terminal according to one embodiment of the present invention.

FIG. 4 is a flowchart for one example of a process for searching background images in a mobile terminal according to one embodiment of the present invention.

In FIG. 4, assume the following steps. First of all, a search for an image is performed. Secondly, the found image is displayed on a background. Thirdly, the displayed image is utilized. In this case, if the image is displayed on the background, it can mean that the corresponding image is displayed on a layer under a text displayed layer not to block a text of an e-book. And, a prescribed transparency can be given to the corresponding image. For clarity and convenience of the following description, the image displayed on the background shall be named 'background image'. Accordingly, a user is able to experience such an effect as reading a book in which a text is printed on a paper on which the background image bas been already printed.

Referring to FIG. 4, if there is a user's command input or a default setting in the course of an e-book reading, the controller 180 is able to perform a background image search.

In doing so, the background image search can be performed through a predetermined external device (e.g., a web server of an e-book publishing company) or such an external device connected via wire/wireless interface as a general internet search engine and the like. Alternatively, the background image search can be performed through an image search within the memory 160 of the mobile terminal itself. In case that such a predetermined external device for a present search function as a publishing company web server and the like is used, one or more images suitable for a corresponding e-book can be prepared per page or chapter in advance.

In a case where a plurality of prepared images are provided, the predetermined external device may send a list of the plurality of prepared images to the mobile terminal 100 first. Upon receiving selection information regarding which image of the plurality of prepared images is selected, the predetermined external device sends the selected image to the mobile terminal 100.

Meanwhile, in case that an image search is performed using a general internet search engine or the memory 160 included in the mobile terminal is searched for an image, it is preferable that a search word is specified. In this case, it is able to specify a search word in a manner that a user chooses or designates the corresponding search word in content of the e-book (e.g., vocabulary in a text, etc.). Alternatively, a word most frequently appearing in a text contained in a currently displayed page, a title of a chapter, to which a corresponding page belongs, or the like can be automatically designated to a search word.

When a plurality of images are found as a result of the background image search, if a user is set to select a background image from the found images in direct [S420], the found images (for clarity and convenience, hereinafter named 'candidate images') can be displayed on the display unit 151 [S430].

If the user selects a prescribed candidate image from a plurality of the candidate images [S440], a range of applying a selected image as a background can be selected [S450]. In the step S420, if a single candidate image exists only or the controller 180 is set to automatically select a candidate image, the candidate image displaying step S430 and the selecting step S440 can be skipped. Moreover, in case that a plurality of candidate images are found, it is able to set the background image to change as a slide show with a predetermined time interval.

Optionally, the above-described background image search is automatically applicable to a corresponding page only or all pages in accordance with a setting. Alternatively, a page range, to which the background image search will be applied, can be selected by a user's manual setting. This shall be described in detail later in this disclosure.

Once the candidate image selection and applied range are determined, the selected image is displayed as a background image in accordance with a setting [S460].

Thereafter, such a side function as a sharing of the selected image, a layout change and the like can be executed in accordance with a selection made by the user [S470].

In the following description, the background image setting process according to one embodiment of the present invention described with reference to FIG. 4 is explained step by step in detail.

In the following drawings including FIG. 5, assume that a content of an e-book is displayed in a manner that two pages are arranged in a horizontal direction on the touchscreen 151 as if a book is opened. Moreover, each position of the currently displayed pages relative to total pages can be represented as thickness of pages stacked under the corresponding page. For instance, in case that an e-book is configured to be read from a left page to a right page, if currently displayed pages are in the early stage of the e-book, the pages stacked under the page currently displayed on a left side are represented as thin, while the pages stacked under the page currently displayed on a right side are represented as thick. Moreover, the stacked pages can be displayed to form steps or inclination as if a book is naturally opened.

FIG. 5 is a diagram for one example of setting a background image function in a mobile terminal according to one embodiment of the present invention.

Referring to FIG. 5 (a), as an e-book reading mode is executed, a text amounting to a quantity of two pages is displayed on a white background in a manner of the above-mentioned assumption. If a setting icon 510 provided to a top side of a right page is selected, a background image setting popup window 520 can be displayed [FIG. 5 (b)]. On the popup window 520, it is able to display a menu for selecting whether to select and display a background image automatically or where a background image search will be performed (e.g., a memory of a mobile terminal, a search engine, etc.). As a background image is set to be used, a text can be displayed on the selected background image [FIG. 5 (c)].

The configuration of the popup window shown in FIG. 5 is just exemplary and is able to contain functions more or less. FIG. 5 shows that a dedicated icon is selected to page the popup window, by which the present invention is non-limited. Optionally, a popup window can be paged through various kinds of paging command types or a plurality of menu steps.

Specification of Search Word

In the following description, a method of specifying a search word for a background image search according to the present invention is explained with reference to FIGS. 6 to 8.

FIG. 6 is a diagram for a method of selecting a search word for a background image search of an e-book from a text in a mobile terminal according to one embodiment of the present invention.

Referring to FIG. 6 (a), a user is able to apply a long touch input to a region 610, in which a desired search word is displayed on a page of an e-book, to specify a search word of a background image.

Subsequently, referring to FIG. 6 (b), an icon 620 for indicating a start point of the search word and an icon 630 for indicating an end point of the search word are displayed in the vicinity of the long-touched point and a menu bar related to a text selection can be displayed on a top side of a screen. On the menu bar, a menu 640 for copying/pasting/cutting a text situated between the two icons 620 and 630 or selecting the text as a search word is placed. In this case. A highlight effect can be given to the text situated between the two icons 620 and 630.

A user is able to drag each icon to enable a desired search word to be situated between the two icons 620 and 630. Once the desired search word is specified through the icon shift, the user touches a search word select menu 640 on the menu bar.

Subsequently, referring to FIG. 6 (c), a search is performed using the selected word. And, an indication message 650 indicating that the search is in progress can be displayed. In doing so, the search is performed on a target through a previously designated object (e.g., an internet search engine, a built-in memory, etc.).

As a result of the search, if a single candidate image exists only, it can be displayed as a background image. As a result of the search, when multiple candidate images are found, if one of the found images are set to be automatically selected, one of the found images can be displayed as a background image [FIG. 6 (d)].

Figure 7:
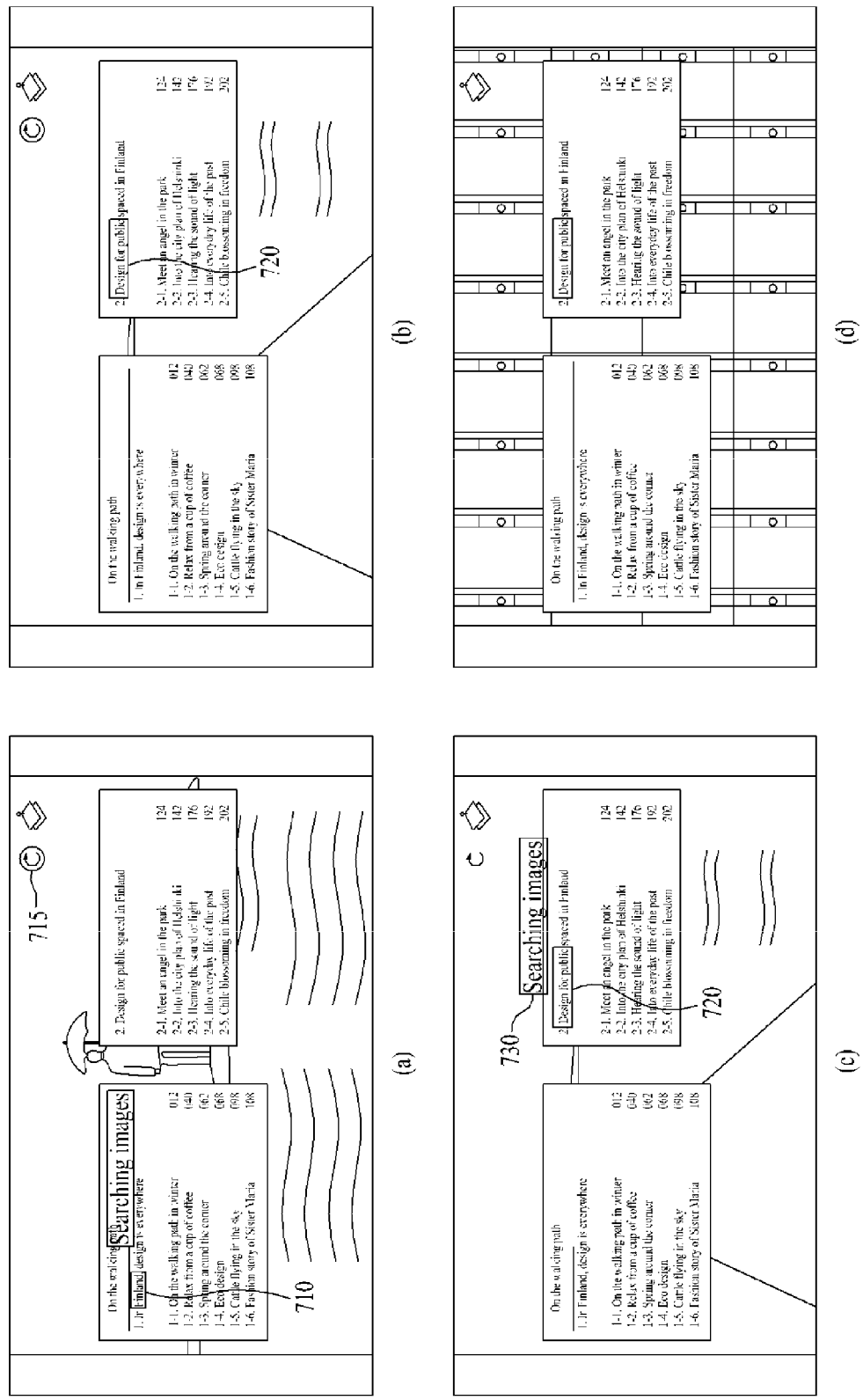
FIG. 7 is a diagram for one example of a method of changing a background image into another candidate image or changing a search word in a mobile terminal according to one embodiment of the present invention.

FIG. 7 is a diagram for one example of a method of changing a background image into another candidate image or changing a search word in a mobile terminal according to one embodiment of the present invention.

Assume that FIG. 7 (a) shows a step subsequent to the former step shown in FIG. 6 (d). And, assume that a plurality of candidate images are found.

When a user attempts to change a background image displayed as a result of the image search, if the user touches a highlighted search word 710 once again, a different one of the candidate images can be displayed as a background image [FIG. 7 (b)]. Moreover, in case that a plurality of candidate images exist, a replacement icon 715 for a background image replacement can be displayed on a right top side of the screen [FIG. 7 (a)]. If the replacement icon 715 is selected, the background image can be changed to one of the plurality of candidate images as shown in FIG. 7 (b).

Meanwhile, in case that a user intends to change a search word itself, the user is able to long touch a point 720 where a desired search word is displayed. If so, a highlight visual effect and an indication message 730, which indicates that a re-search is performed, can be displayed at the corresponding point 720.

Therefore, a background image found through the changed search word can be displayed as shown in FIG. 7 (d).

Figure 8:
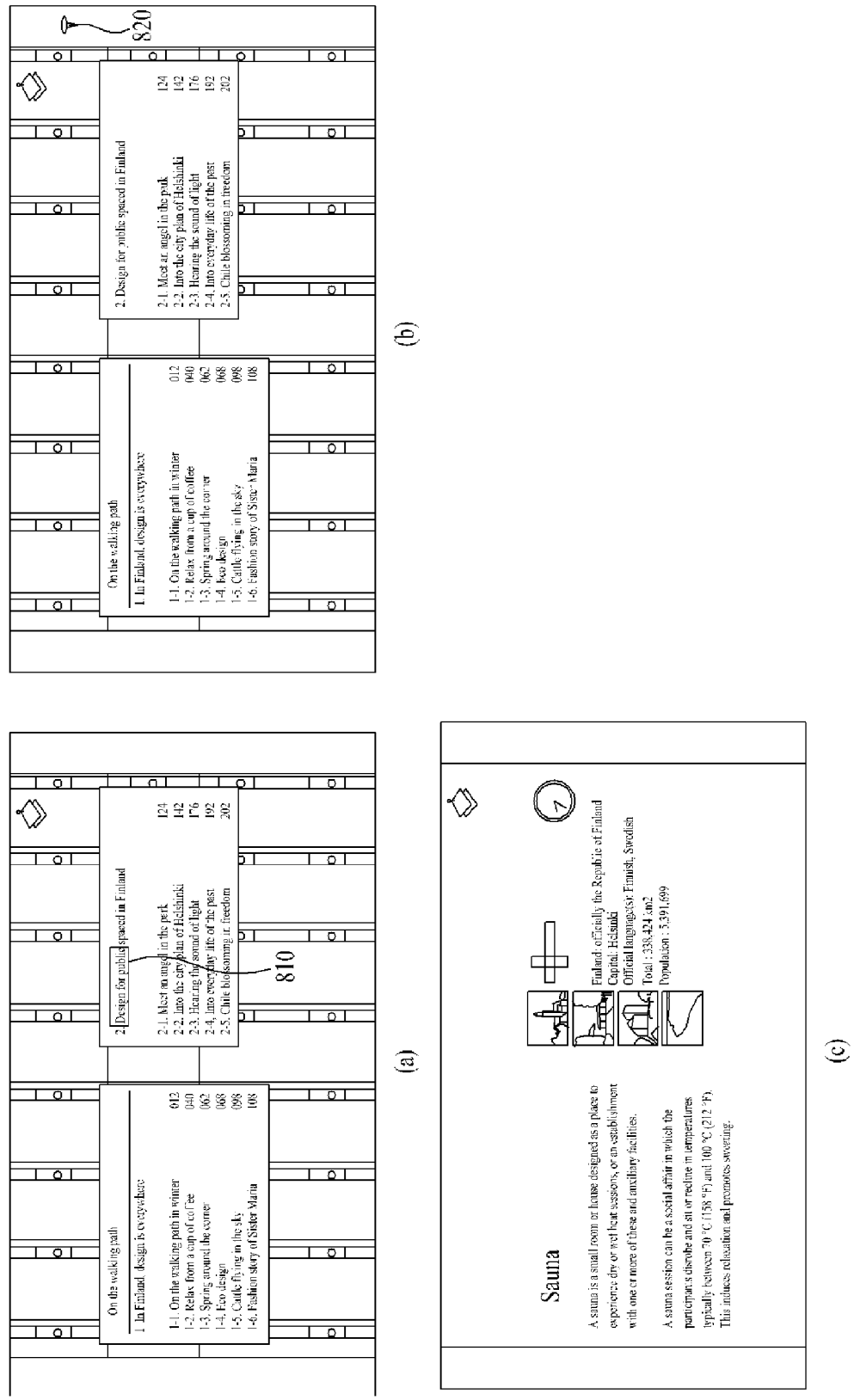
FIG. 8 is a diagram for one example of indicating whether a background image is set on a corresponding page in a mobile terminal according to one embodiment of the present invention.

FIG. 8 is a diagram for one example of indicating whether a background image is set on a corresponding page in a mobile terminal according to one embodiment of the present invention.

Assume that FIG. 8 (a) shows a step subsequent to the former step shown in FIG. 7 (d).

Referring to FIG. 8 (a), a highlight visual effect is given to a search word 810 to indicate that a selection of a background image has not been confirmed. If a region, on which a text is not displayed on currently displayed pages, is touched, the selection can be completed. If the selection is completed, an icon 820 of a pushpin type, which indicates that the background image is confirmed, can be displayed on the corresponding page. Of course, the icon type is just exemplary, by which the present embodiment is non-limited.

In case that the set background image is applied to a currently displayed page only, when the current page is turned to a different page through a page scroll, as shown in FIG. 8 (c), the background image and the pushpin icon, which were set on the previous page, are not displayed thereon anymore.

Cancellation of Background Image Setting

FIG. 9 is a diagram for one example of a method of canceling a setting of an image from a background image in a mobile terminal according to one embodiment of the present invention.

Referring to FIG. 9, in case that a flicking touch in a vertical direction is applied to a page, on which a background image is set, using a pointer (e.g., a finger 910) [FIG. 9 (a)], the background image can be removed from the corresponding page [FIG. 9 (b)]. When the pushpin icon 820 described with reference to FIG. 8 (b) is displayed, if a long touch is applied to the pushpin icon or a flicking touch input is applied to the pushpin icon toward an outside of the corresponding page, both of the pushpin and the background image can be removed.

Display of Candidate Image & Extension of Search Word

In the following description, when a plurality of candidate images exist as a result of a search, a method of displaying the candidate images to enable a user to directly select a background image and a method of extending a search word through the displayed candidate images are explained with reference to FIGS. 10 to 12.

FIG. 10 is a diagram for one example of displaying a plurality of candidate images in a mobile terminal according to one embodiment of the present invention.

In FIG. 10, assume a case that a search word is specified as 'Finland' on a text of a currently displayed page through a procedure similar to the former procedure shown in FIG. 6 (a) and FIG. 6 (b). And, the process shown in FIG. 10 does not assume a case that a single candidate image exists according to a search result or that one of a plurality of candidate image is automatically selected as a background image according to a search result but assumes a case that a user is able to directly select one of a plurality of candidate images which are found and displayed through a candidate image search.

Referring to FIG. 10 (a), a search word 101 is displayed on a top side and a plurality of candidate images 1020, 1030 and 1040 found through a search are displayed on a middle side. In doing so, the candidate image 1020 is displayed on a center of the middle side in a manner of being applied as a background image [i.e., displayed as a preview].

If a user inputs a flicking touch in a right direction, a new candidate image 1050 is displayed on a left part of the middle side of the touchscreen as the candidate images are scrolled to the right and the candidate image 1030 previously situated at a left part of the middle side in FIG. 10 (a) is situated at the center of the middle side [FIG. 10 (b)]. Therefore, a preview of the corresponding page, to which the candidate image shifted to the middle side is applied as a background image, can be displayed on the center. Of course, if a flicking touch is applied in a left direction, the candidate images can be scrolled in a direction opposite to the former direction mentioned in the above description.

After the user has situated a desired candidate image at the center through the flicking touch, if the corresponding image is touched, the background image can be set as shown in FIG. 10 (c).

Moreover, in a case where a plurality of candidate images are searched as described with reference to FIGS. 10a to 10c and each of the plurality of candidate images is displayed on the display 151, a user may choose background images to be changed as a slide show with a predetermined time interval, among the displayed candidate images. For example, when a plurality of candidate images found through a search are displayed as shown in FIG. 10a, a check-box (not shown) can be displayed in each of the candidate images. As a user selects a specific check-box by applying a touch input thereon, a check-mark can be displayed in the specific check-box and indicate that an image corresponding to the specific check-box is chosen as images for the slide show. If a plurality of check-boxes are selected, a plurality of candidate images corresponding to the selected check-boxes are used for the slide show. After the selection of check-boxes is completed, the slide show may be started as the user touches a region except the check-boxe of arbitrary candidate image.

In the following description, a method of performing a related search is explained with reference to FIG. 11.

Figure 11:
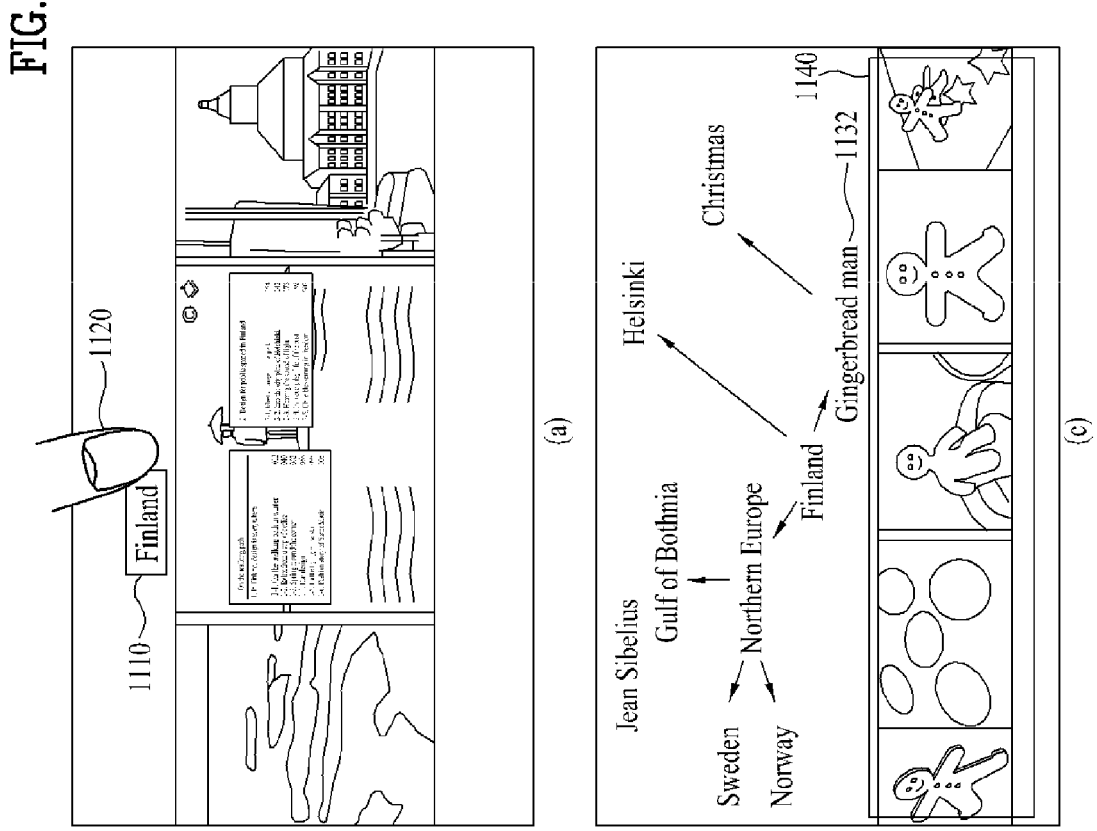
FIG. 11 is a diagram for one example of performing a related search by extending a search word when a plurality of candidate images are displayed in a mobile terminal according to one embodiment of the present invention.

FIG. 11 is a diagram for one example of performing a related search by extending a search word when a plurality of candidate images are displayed in a mobile terminal according to one embodiment of the present invention.

The same assumptions of FIG. 10 are applied to FIG. 11.

Referring to FIG. 11, in order to perform a related search, a user is able to select a highlighted search word 1110 using a finger 1120 [FIG. 11 (a)]. If so, related search words of the selected search word 1131 are displayed on a top side region of a touchscreen and candidate images are displayed as reduced thumbnails on a bottom side region 1140 [FIG. 11 (b)].

If a prescribed related search word 1132 is selected from the related search words, thumbnails of candidate image, of which search word is set to the selected related search word 1132, are displayed on the bottom side region 1140 [FIG. 11 (c)]. If the selected related word 1132 is selected again, the screen returns to a screen arrangement similar to that shown in FIG. 11 (a) [FIG. 11 (d)]. As a selected related search word 1115 is displayed next to an initial search word 1110, a search word change history can be recognized.

FIG. 12 is a diagram for another example of displaying a plurality of candidate images in a mobile terminal according to one embodiment of the present invention.

Referring to FIG. 12, if an image search icon 1210 at a right side edge is selected in an e-book reading mode [FIG. 12 (a)], a screen is partitioned into a left region and a right region and a search result is displayed on the rights region [FIG. 12 (b)]. In this case, after a search word has been specified via the former procedure as shown in FIG. 6 (a) and FIG. 6 (b), the image search icon 1210 can be selected. In case that a search icon is selected without such specification, a name of a contents table, to which a corresponding page belongs, a most frequently appearing word on a corresponding page or the like can become a search word.

The right region can include a candidate image tab 1220 and a review tab 1230. FIG. 12 (*b*) shows a case that the candidate image tab 1220 is selected. And, the found candidate images can be displayed below the displayed candidate images.

Subsequently, if the review tab 1230 is selected, it is able to display a different user's review search result of a currently read e-book itself, a currently displayed page or a currently displayed chapter [FIG. 12 (*c*)]. Thereafter, if the search icon 1210 is selected again, the screen partition can be cancelled into the status shown in FIG. 12 (*a*).

Settings of Applied Range

In the following description, a method of selecting an applied range of a background image set in a mobile terminal according to one embodiment of the present invention is explained with reference to FIG. 13.

FIG. 13 is a diagram for one example of a method of selecting an applied range of a background image set in a mobile terminal according to one embodiment of the present invention.

Referring to FIG. 13, it is able to select a background setting icon 1310 from a page on which a background image is already set [FIG. 13 (*a*)]. As the background setting icon 1310 is selected, a page setting popup window 1320 can be displayed [FIG. 13 (*b*)]. A contents table is displayed on the page setting window 1320 and a vertical line 1330 for connecting the contents in the table together is displayed as well. A start page icon 1340 is displayed at a point corresponding to a page, from which the background setting icon is selected, i.e., a page with which the background image application starts. If a user selects a prescribed point from the vertical line, a corresponding background image can be applied to the pages from the background image application starting page to the page corresponding to the selected point. Moreover, in order to help the user's page selection, a thumbnail 1350 of a page corresponding to a point touched by the user on the vertical line can be displayed in the vicinity of the vertical line.

Of course, a vertical line 1330 can be set to be displayed on a bottom side of a touchscreen in a horizontal direction only rather than displayed as the popup window shown in FIG. 13 (*c*).

According to the description with reference to FIG. 13, when a background image has been already set on an application start page, if a background setting icon is selected, an applied range can be selected, which is exemplary and by which the present invention is non-limited. Alternatively, if a background image is selected by one of the aforesaid methods, the popup window shown in FIG. 13 (*b*) or the vertical line shown in FIG. 13 (*c*) can be displayed without such an input as a separate icon selection and the like.

Though it is not shown in Figures, according to another aspect of the present embodiment, the applied range of a background image may be set in proportion of a duration during which a specific touch input is maintained on an empty region of a page where a background image is set or on the background setting icon. For example, when a long touch input is applied on an empty region of a specific page where a background image is already set, pages following the specific page start to be turned at a prescribed speed while the touch is maintained. After a number of pages have been turned, if the user releases the touch input, the background image of the specific page can be applied to the turned pages at once.

Application of Other Background Effects

According to the above-described embodiments, a search for a still image is performed and the found still image is then displayed on a background. Moreover, the present invention is applicable to a background image of a video type or a simple color. This is described with reference to FIG. 14 as follows.

FIG. 14 is a diagram for one example of displaying a visual effect except a still image as a background in a mobile terminal according to one embodiment of the present invention.

Referring to FIG. 14, if such a text related to weather or season as 'snow', 'winter' and the like exists in a content of an e-book or 'snow' or 'winter' is automatically or manually determined as a search word [FIG. 14 (*a*)], a video visual effect such as 'snowing in a background' can be given [FIG. 14 (*b*)]. Moreover, in case that a search word is 'Shower' [FIG. 14 (*c*)], such a visual effect as 'font is spreading due to rain' can be displayed as a background. In case that the visual effect of 'raining' or 'snowing' is given, 'sound on stepping on snow' or 'sound of rain' can be played together with the visual effect.

Optionally, a bright color is given to a background of a left page containing affirmative words more, while a dark color is given to a background of a right page containing negative words more.

Besides, an audio effect can be played as a background. This is described with reference to FIG. 15 as follows.

Figure 15:
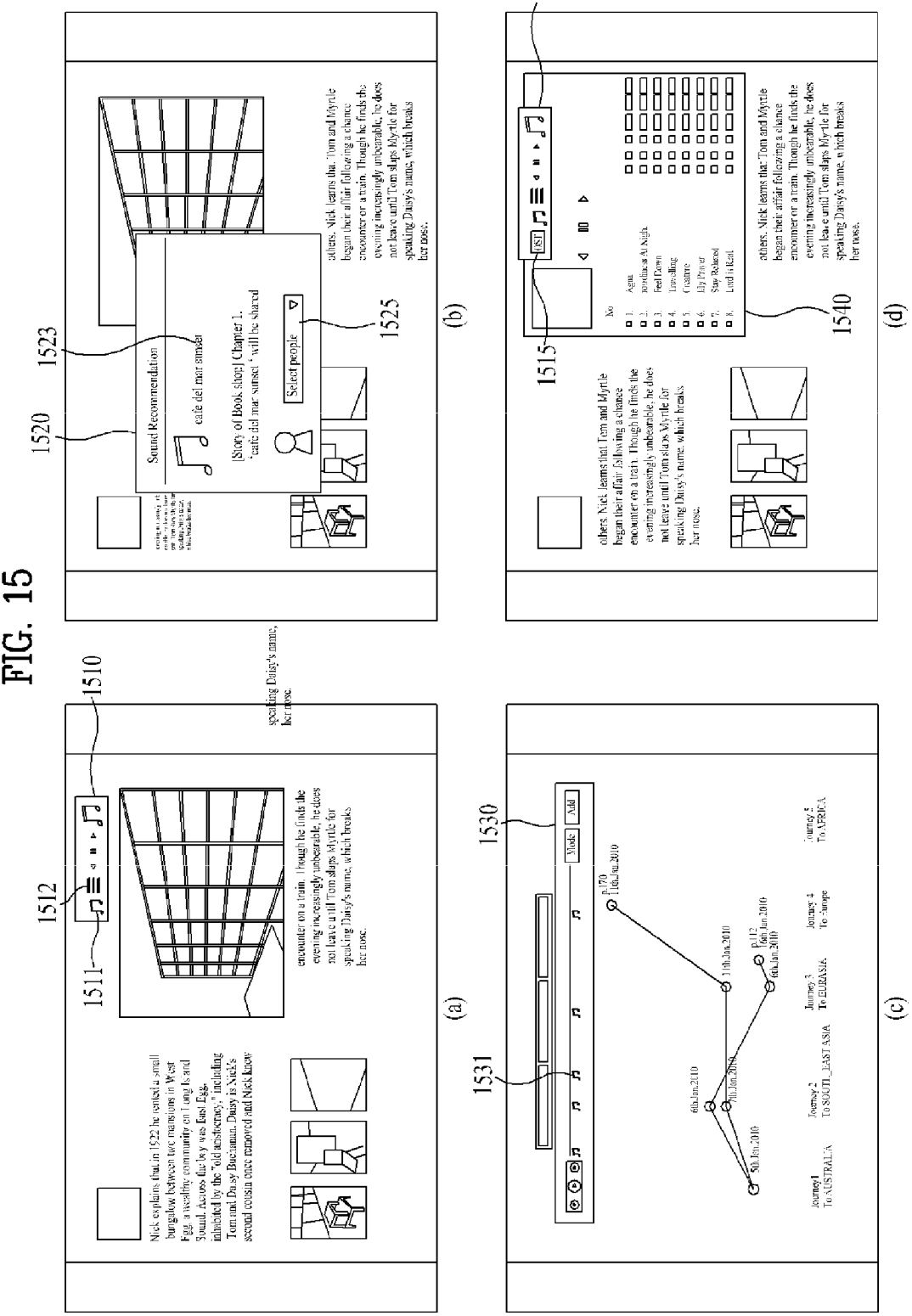
FIG. 15 is a diagram for one example of playing an audio effect as a background in a mobile terminal according to one embodiment of the present invention.

FIG. 15 is a diagram for one example of playing an audio effect as a background in a mobile terminal according to one embodiment of the present invention.

Referring to FIG. 15, as a background audio function is activated, an audio tool box 1510 can be displayed on a prescribed edge of a screen [FIG. 15 (*a*)]. In this case, a sharing menu 1511 for sharing a currently played music with other users on executing an e-book reading mode in a mobile terminal, a per-progress rate play list menu 1513, a control menu (e.g., play, stop, next music, previous music, etc.) for changing a play status of music and the like can be displayed in the audio tool box.

If the sharing menu 1511 is selected from the audio tool box 1510, a sharing popup window 1520 can be displayed [FIG. 15 (*b*)]. In the sharing popup window 1520, a title of a shared music, a chapter information 1523 on a title of a shared music and a currently displayed page or a chapter (to which the corresponding page belongs) and a dropdown box 1525 for selecting a sharing target can be displayed. If the dropdown box 1525 is selected, a list of sharing targets can be displayed. In this case, the sharing target refers to a phonebook previously stored in a mobile terminal, an account list of accounts previously subscribed in association with an application for an e-book reading and the like.

If the per-progress rate play list menu 1513 is selected from the audio tool box 1510, a contents table list is displayed on a bottom side, a per-date reading progress graph is displayed on a middle side, and a music progress zone 1530 indicating a music played per hour is displayed on a top side [FIG. 15 (*c*)]. Within the music progress zone 530, a musical note icon is displayed each time a music is changed on reading an e-book. If a prescribed musical note icon is selected from the displayed musical note icons, a corresponding music can be played back.

Meanwhile, in case that there exists an original sound track (O.S.T.) related to a currently read e-book exists, an OST menu 1515 can be displayed in the audio tool box 1510 in addition. If the OST menu 1515 is selected, it is able to display a popup window 1540 for indicating OST information.

Utilization of Background Image

In the following description, side functions using a background image are explained.

First of all, a method of checking a background image more conveniently is explained with reference to FIG. 16 and FIG. 17 as follows.

FIG. 16 is a diagram for one example of a method of checking a portion of an image set as a background without interruption of a text in a mobile terminal according to one embodiment of the present invention.

In FIG. 16 and FIG. 17, assume that transparency of a prescribed rate is given to a background image.

Referring to FIG. 16, a background image is set to a map image. In this case, a prescribed transparency is given to the background image. And, the background image is blocked by a text. Therefore, it may be difficult for a user to clearly see a map set as the background image. If so, the user approximately touches a part to see clearly with two fingers 1610 and 1620 and increases a distance between the two fingers 1610 and 1620 while maintaining the touch [FIG. 16 (*a*)]. Hence, a vertical line 1630 including a center point of the two touch points is cleaved, whereby the background image is clearly displayed through the corresponding cleavage (i.e., the given transparency is cancelled and the text is removed) [FIG. 16 (*b*)]. After the user has checked the background image, the user decreases the distance between the touch points of the two fingers to return to the status shown in FIG. 16 (*a*).

FIG. 17 is a diagram for one example of a method of checking a whole image set as a background without interruption of a text in a mobile terminal according to one embodiment of the present invention.

Referring to FIG. 17, in order to clearly check a whole background image, a user is able to apply a long touch input to a page edge with a finger 1710 [FIG. 17 (*a*)]. If so, a portion of a background image 1720 can appear in the vicinity of the long-touched edge [FIG. 17 (*b*)]. If a partial region of the appearing background image 1720 is selected, the corresponding background image 1720 can be displayed as a whole screen [FIG. 17 (*c*)]. In doing so, a visual effect can be given in a following manner. First of all, when the portion of the background image 1720 appears in FIG. 17 (*b*), an image appears in a manner of sliding out from a page behind a right page. Secondly, the background image 1720 slides out of the page behind the right page and then covers the currently displayed pages from the right side.

For another example of a side function according to the present invention, a method of changing a layout using a background image is explained with reference to FIGS. 18 to 22 as follows.

Figure 18:
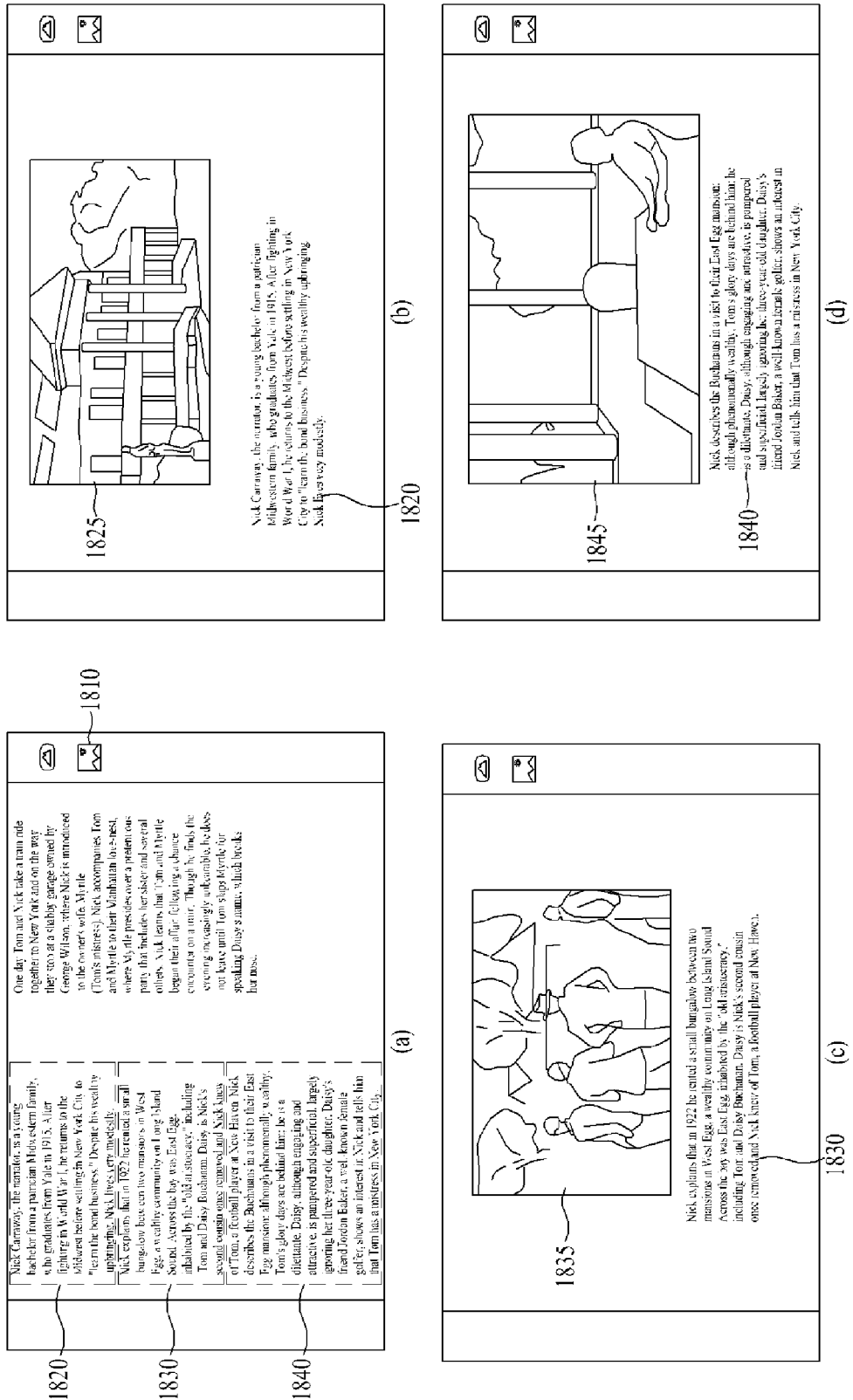
FIG. 18 is a diagram for one example of changing a layout to display a background image per paragraph in a mobile terminal according to one embodiment of the present invention.

FIG. 18 is a diagram for one example of changing a layout to display a background image per paragraph in a mobile terminal according to one embodiment of the present invention.

Referring to FIG. 18, when an e-book reading mode is executed, a per-paragraph image insert icon 1810 can be displayed on a right edge [FIG. 18 (*a*)]. If the per-paragraph image insert icon 1810 is selected, layouts of first to third paragraphs 1820, 1830 and 1840 can be changed and displayed in the following manner. First of all, a search for a background image 1825 suitable for the first paragraph 1820 is performed. The found background image 1825 is then displayed as a single page together with the first paragraph 1820 FIG. 18 (*b*)]. Secondly, a search for a background image 1835 suitable for the second paragraph 1830 is performed. The found background image 1835 is then displayed as a single page together with the second paragraph 1830 FIG. 18 (*c*)]. Thirdly, a search for a background image 1845 suitable for the third paragraph 1840 is performed. The found background image 1845 is then displayed as a single page together with the third paragraph 1840 [FIG. 18 (*d*)]. In doing so, the background image can be displayed in a manner of not overlapping with a text and having no transparency given thereto. This provides an effect of seeing an e-book as if a text based e-book is converted to a picture book.

Similarly, it is able to set a single background image to be displayed per predetermined number of page(s).

Figure 19:
FIG. 19 is a diagram for one example of changing a layout to display a background image by a predetermined page unit in a mobile terminal according to one embodiment of the present invention.

FIG. 19 is a diagram for one example of changing a layout to display a background image by a predetermined page unit in a mobile terminal according to one embodiment of the present invention.

In FIG. 19, assume a case that a layout is set to be changed in a manner of inserting an image per 2 pages.

Referring to FIG. 19, when an e-book reading mode is executed, a unit image insert icon 1910 can be displayed on a right edge [FIG. 19 (*a*)]. If the unit image insert icon 1910 is selected, a found image is inserted by a preset unit (e.g., 2 pages herein) to change a page layout as shown in FIG. 19 (*b*).

FIG. 20 is a diagram for one example of changing a layout to display an image found from a specific page on a most upper layer in a mobile terminal according to one embodiment of the present invention.

Referring to FIG. 20, in case of attempting to attach a multimedia content to a specific page in the course of reading the corresponding page, a user is able to select an attach menu 2010 [FIG. 20 (*a*)]. If so, a popup window 2020 for receiving a selection of a type of an attached content can be displayed as shown in FIG. 20 (*b*). If an image menu 202 is selected from the popup window 2020, an image search can be performed on the corresponding page using a search word directly selected by the user or a search word selected automatically. And, one of the found images can be displayed on a layer upper than a layer on which a text is displayed (i.e., in order for the image to block the text) as shown in FIG. 20 (*c*).

Meanwhile, the e-book, to which a user has added contents, is able to overwrite an original e-book file in a general e-book format (e.g., E-pub) or an e-document format (e.g., PDF file, DOC file, PPT file, etc.) or can be saved as a new file. Thus, the generated file can be stored in the memory 160 and can be automatically added to an e-book list of a prescribed type provided by an application for reading e-books.

And, the e-book, to which a user has added contents, is shared by means of P2P computing or networking architecture or can be electrically shared by being uploaded to an external server. In this case, the external server conceptionally includes a general web server or an e-book selling server accessible by a user for a download. In particular, a user is able to share or sell the e-book, which is generated in a manner that the user has added contents thereto, freely.

Moreover, information on the added content except contents of the original e-book is separately saved and can be then shared only. Through this, sharing is possible with a smaller storage capacity. And, users already retaining the original e-book obtain the information on the added content only and are then able to supplement the contents of the book.

Figure 21:
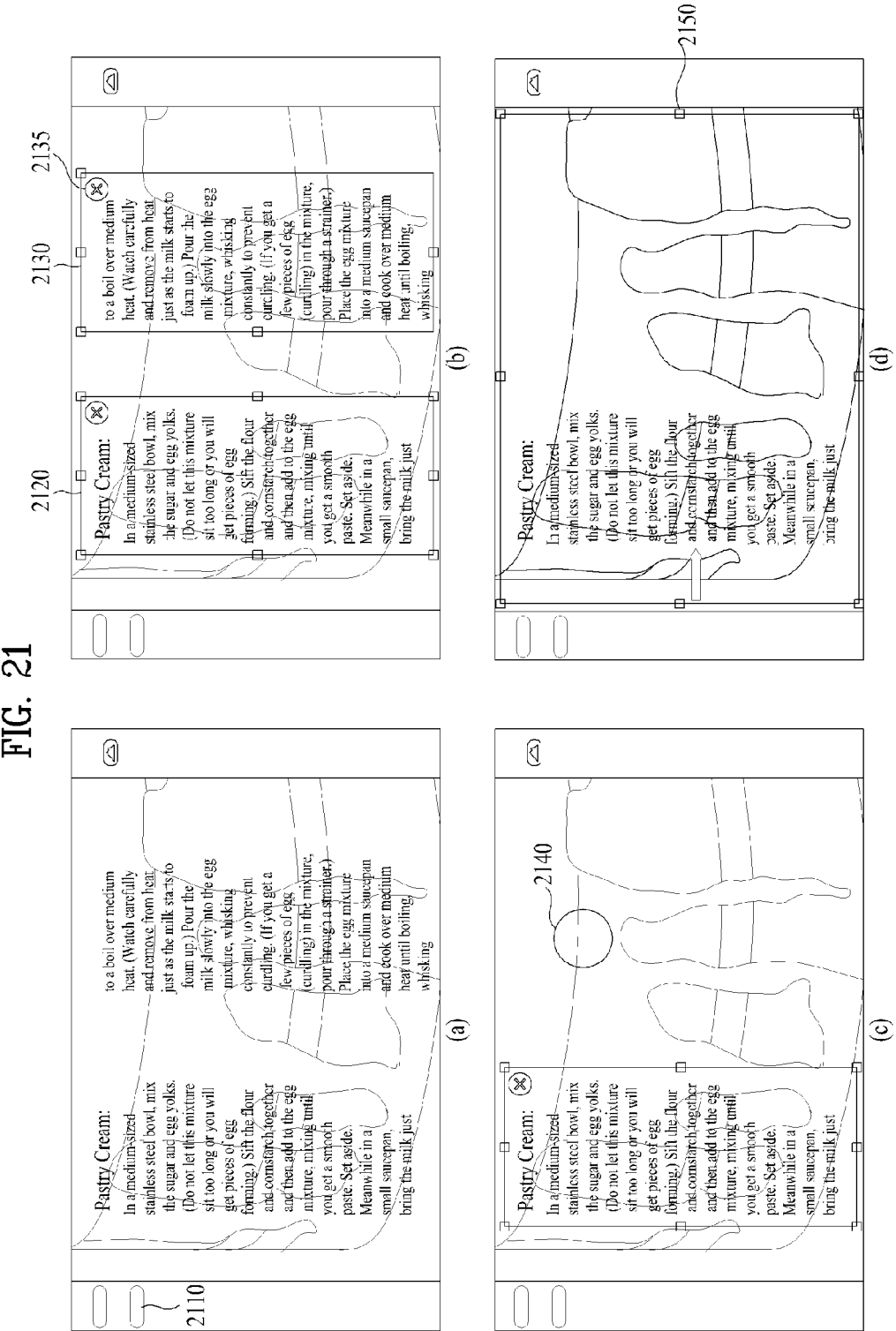
FIG. 21 is a diagram for one example of changing a layout in a manner of setting a text region and a background region separately in a mobile terminal according to one embodiment of the present invention.

FIG. 21 is a diagram for one example of changing a layout in a manner of setting a text region and a background region separately in a mobile terminal according to one embodiment of the present invention.

Referring to FIG. 21, while a background image is already set, if a user attempts to change a layout, the user is able to select a layout change menu 2110 [FIG. 21 (*a*)]. Text boxes 2120 and 2130, each of which indicates a text region per page, are then displayed as shown in FIG. 21 (*b*). Touch points lie at four vertexes of each of the text boxes. And, a touch point also lies at a center between every 2 vertexes. If each of the points is dragged, a size and/or shape of the corresponding text box is changeable to correspond to a distance and direction of the drag. And, an arranged status of a text can be automatically changed to correspond to the change of the text box. Moreover, if a text box remove icon 2135 is selected from a right pag4e, the corresponding text box can be removed from the corresponding page [FIG. 21 (*c*)]. Thereafter, if a touch input is applied to a random point 2140 in the text box removed region, the corresponding text ox disappears and touch points are displayed at vertexes of the background image and the centers between every two of the vertexes to perform a layout change on the background image [FIG. 21 (*d*)]. In case that a user attempts to display a background image on a right page only, the user drags the touch point 2150 lying at the center of the left side to the right to reduce a size of the background image into a half.

In the following description, a process for performing the layout change on the background image is explained with reference to FIG. 22.

Figure 22:
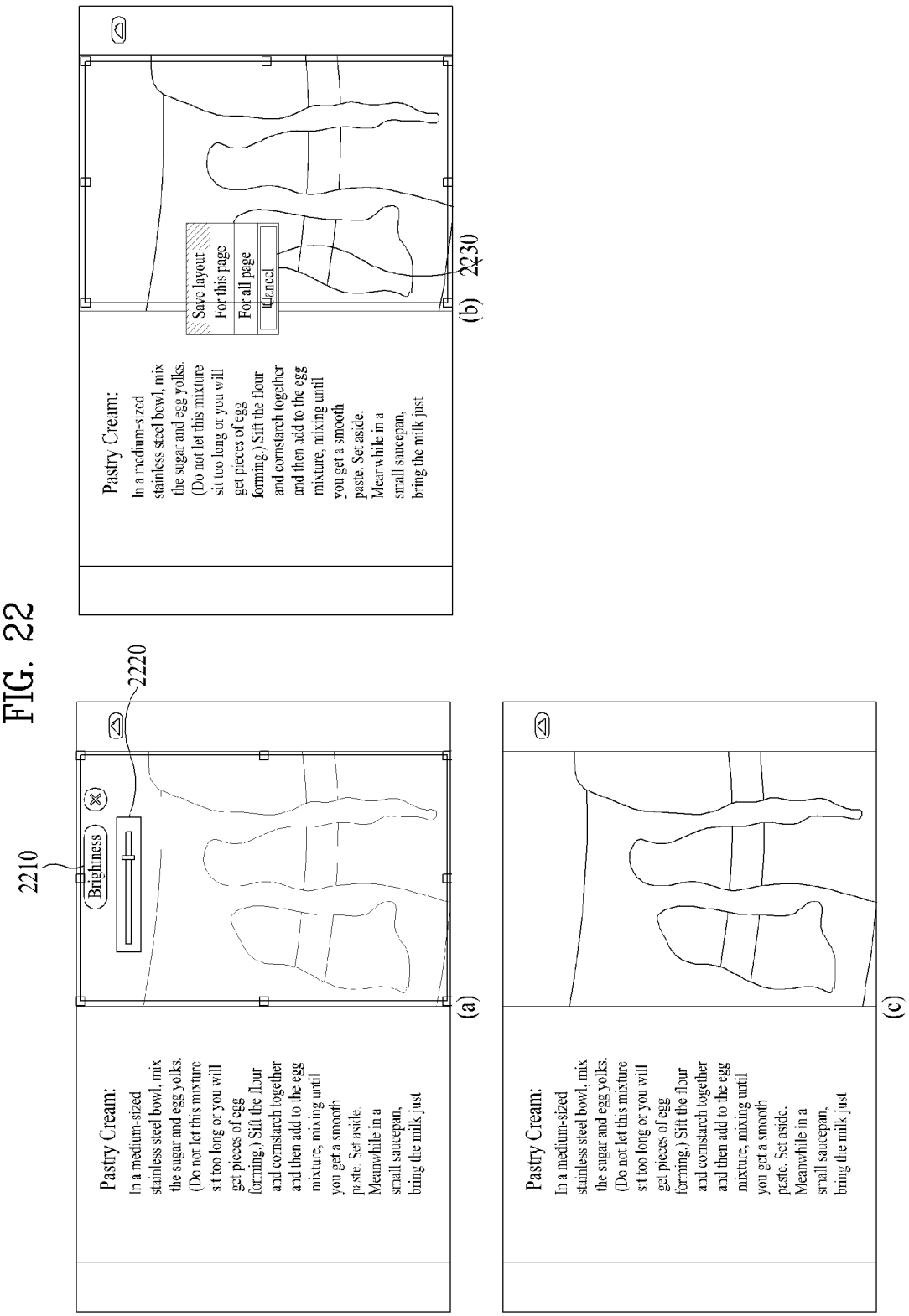
FIG. 22 is a diagram for another example of changing a layout in a manner of setting a text region and a background region separately in a mobile terminal according to one embodiment of the present invention.

FIG. 22 is a diagram for another example of changing a layout in a manner of setting a text region and a background region separately in a mobile terminal according to one embodiment of the present invention.

Assume that FIG. 22 (*a*) shows a procedure in continuation with the former procedure shown in FIG. 21 (*d*). As a touch point is dragged to the right in FIG. 21 (*d*), a background image is displayed on a right page in FIG. 22 (*a*) only. In doing so, if the user selects a brightness adjust menu 2210, an adjust bar 2220 for determining a brightness of the background image can be displayed. In particular, the user is able to adjust the brightness of the background image in a manner of changing a position of the adjust bar 2220. Thereafter, if the user applies a long touch input to a random page or applies multiple touch inputs to the random page within a predetermined period of time, a layout change mode is terminated and a popup window 2230 for receiving a selection of a range for applying a changed layout thereto can be displayed as shown in FIG. 22 (*b*). If the applied range is determined via the popup window 2230, a text and a background image can be displayed in accordance with the changed layout within the selected range as shown in FIG. 22 (*c*).

The change of the layout can be triggered by a combination within a cradle. In this case, the cradle means a device for mounting a mobile terminal. The cradle performs a mounting function only or is able to perform a charging function or a data exchange function in a manner of being connected via a connector. For example, while an e-book reading mode is executed, if a mobile terminal is combined with the cradle, a text disappears but a background image is displayed only. Moreover, in case that there is a background audio set on the corresponding page, a corresponding audio can be played together with the background image.

Meanwhile, a background effect can be set on a whole range if an e-book is purchased or is initially read after a simple download of the e-book. This is described with reference to FIG. 23 as follows.

Figure 23:
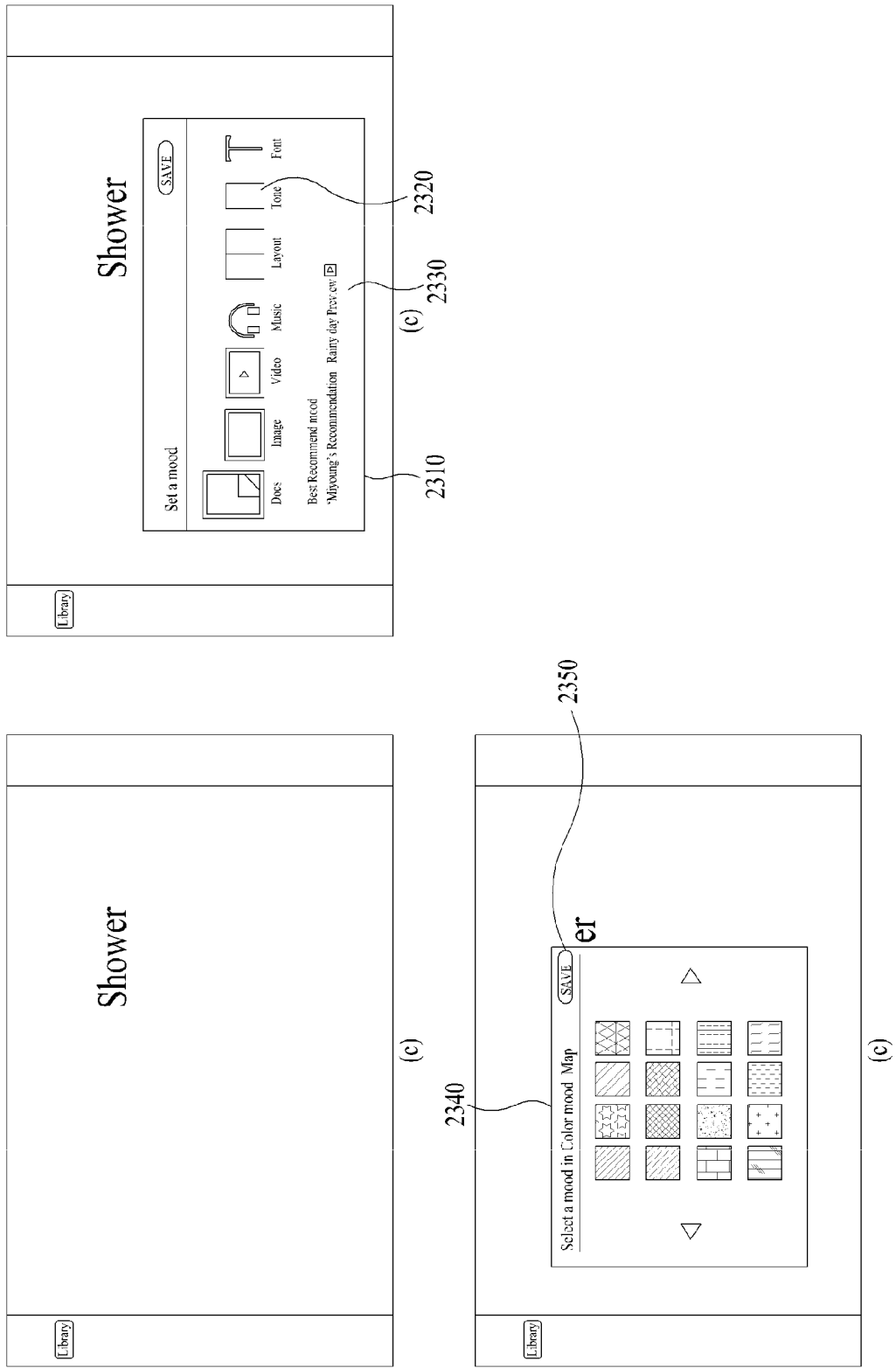
FIG. 23 is a diagram for one example of a method of setting a total background effect in advance in a mobile terminal according to one embodiment of the present invention.

FIG. 23 is a diagram for one example of a method of setting a total background effect in advance in a mobile terminal according to one embodiment of the present invention.

Referring to FIG. 23, after a user has purchased an e-book of which title is 'Shower', if the purchased e-book is initially read [FIG. 23 (*a*)], a popup window 2310 for an initial background effect setting can be displayed [FIG. 23 (*b*)]. In doing so, on the popup window 2310, menus for setting image, video, audio and color as backgrounds, respectively, a menu for changing a layout, a menu for changing a font, a menu 2330 for directly applying a setting recommended by another user and the like can be displayed. If a background color setting menu 2320 is selected from the popup window 2310, a popup window 2340 for a color selection can be displayed [FIG. 23 (*c*)]. If the color selection is completed, the user selects a save menu 2350 to complete the background color setting. In doing so, if a prescribed color is selected, as mentioned in the foregoing description with reference to FIG. 13, the process for selecting the applied range can be performed. In case that a menu 2330 for applying a setting recommended by a different user in direct is selected, a menu for selecting a different user having uploaded a setting on a corresponding e-book can be displayed. In this case, the menu for selecting the different user can display a preview thumbnail, to which a setting added by the corresponding user having been applied, and the like together with such information for identifying a user as a name, an ID and the like. Once a user is designated, a background image can be changed in accordance with a setting uploaded by a user having selected a corresponding 3-book.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments of the mobile terminal and controlling method thereof are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

What is claimed is:

1. A mobile terminal comprising:
   a touchscreen configured to display a first page of an e-book including at least one or more pages;
   a memory unit configured to store at least one image;
   a communication unit configured to exchange data with an external device by wire/wireless; and
   a controller adapted to:
   search at least one of the memory unit and a search server connected via the communication unit for at least one or more candidate images with a search word determined using at least one portion of a content of the first page;
   control a selected one of the found at least one or more candidate images to be displayed as a background image of the first page; and
   change a layout of paragraphs in the first page in response to displaying the selected image as the background image of the first page.

2. The mobile terminal of claim 1, wherein the controller is adapted to set the search word to a most frequently appearing word in a text content of the first page if a first touch input on the touchscreen is recognized.

3. The mobile terminal of claim 1, wherein if a second touch input is applied, the controller is adapted to display an image search icon on a prescribed region on the touchscreen.

4. The mobile terminal of claim 1, wherein if at least one or more candidate images are found, the controller is adapted to control each of the found at least one or more candidate images to be displayed as a thumbnail on a first region of the touchscreen.

5. The mobile terminal of claim 1, wherein if a touch input is applied to one of the thumbnails of the at least one or more candidate images, the controller is adapted to determine one of the at least one or more candidate images corresponding to the touch-inputted thumbnail as the selected image.

6. The mobile terminal of claim 1, wherein a check box selectable by a touch input through the touchscreen is included in a thumbnail corresponding to each of the found at least one candidate image and wherein the controller is adapted to determine a candidate image selected via the check box as the selected image.

7. The mobile terminal of claim 6, wherein if a plurality of candidate images are selected through the check boxes, respectively, the controller is adapted to change the selected image in a manner of circulating a plurality of the selected candidate images in each predetermined time interval.

8. The mobile terminal of claim 1, wherein the controller is adapted to control at least one of the selected image and information on the selected image to be saved as a file of a prescribed format in the memory unit separately or together with the e-book and/or is adapted to control the saved file to be shared with an external device via the communication unit.

9. A mobile terminal comprising:
a touchscreen configured to display a first page of an e-book including at least one or more pages;
a memory unit configured to store at least one image;
a communication unit configured to exchange data with an external device by wire/wireless; and
a controller adapted to:
search at least one of the memory unit and a search server connected via the communication unit for at least one or more candidate images with a search word determined using at least one portion of a content of the first page; and
control a selected one of the found at least one or more candidate images to be displayed as a background image of the first page,
wherein after the selected image has been displayed as the background image of the first page, if a touch input to a specific point of the first page is maintained over a predetermined time, the controller is adapted to control following pages next to the first page to be sequentially displayed depending on the touch input maintained time, wherein if the touch input is cancelled, the controller is adapted to control the selected image to be set as the background image from the first page to the page from which the touch input was canceled.

10. The mobile terminal of claim 1, wherein the controller is adapted to give a prescribed semitransparent effect to the background image.

11. The mobile terminal of claim 1, wherein the at least one or more candidate images include at least one of a video and a still picture.

12. A method of controlling a mobile terminal, comprising:
displaying a first page of an e-book including at least one or more pages;
searching for at least one or more candidate images with a search word determined using at least one portion of a content of the first page;
displaying a selected one of the found at least one or more candidate images to be displayed as a background image of the first page; and
changing a layout of paragraphs in the first page in response to displaying the selected image as the background image of the first page.

13. The method of claim 12, further comprising displaying the found at least one or more candidate images in a prescribed shape.

14. The method of claim 12, wherein the searching for the at least one or more candidate images comprises:
searching a memory of the mobile terminal; and
performing an image search on a search engine with the search word via a wireless communication unit.

15. The method of claim 12, wherein the search word comprises a portion of a text content in the content of the first page.

\* \* \* \* \*